United States Patent
DeMaris et al.

(10) Patent No.: US 11,128,717 B2
(45) Date of Patent: Sep. 21, 2021

(54) PRIVATE EDITING OF SHARED FILES

(71) Applicant: Microsoft Technology Licensing, LLC, Redmond, WA (US)

(72) Inventors: John Lincoln DeMaris, Seattle, WA (US); Omar Hussein Shahine, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 14/946,579

(22) Filed: Nov. 19, 2015

(65) Prior Publication Data

US 2017/0149906 A1    May 25, 2017

(51) Int. Cl.
*H04L 29/08*    (2006.01)
*G06Q 10/10*    (2012.01)

(52) U.S. Cl.
CPC ......... *H04L 67/142* (2013.01); *G06Q 10/101* (2013.01); *H04L 67/02* (2013.01); *H04L 67/06* (2013.01); *H04L 67/327* (2013.01)

(58) Field of Classification Search
CPC ........... H04L 29/06034; H04L 12/1822; H04L 29/08072; H04L 29/06; G06F 11/1446; G06F 11/1456; G06F 17/30067; G06F 17/30575; G06F 17/30212; G06Q 10/10
USPC ........................................................ 709/205
See application file for complete search history.

(56) References Cited

U.S. PATENT DOCUMENTS

| | | | |
|---|---|---|---|
| 5,255,387 A | 10/1993 | Arnold et al. | |
| 7,783,665 B1 | 8/2010 | Tormasov et al. | |
| 8,849,759 B2 | 9/2014 | Bestler et al. | |
| 8,856,256 B1 | 10/2014 | Srinivasan | |
| 2002/0056003 A1 | 5/2002 | Goswami | |
| 2004/0015522 A1 | 1/2004 | Hensbergen | |
| 2009/0172005 A1* | 7/2009 | LaToza | G06F 40/186 |
| 2010/0198871 A1 | 8/2010 | Stiegler et al. | |

(Continued)

FOREIGN PATENT DOCUMENTS

| | | |
|---|---|---|
| CN | 1787443 A | 6/2006 |
| CN | 101933013 A | 12/2010 |
| CN | 102799664 A | 11/2012 |

OTHER PUBLICATIONS

"AltME User Guide—File Sharing", Published on: Mar. 23, 2006 Available at: http://www.altme.com/guide/files.html.

(Continued)

*Primary Examiner* — Mahran Y Abu Roumi

(74) *Attorney, Agent, or Firm* — Newport IP, LLC; Jacob P. Rohwer

(57) ABSTRACT

Systems, components, devices, and methods for privately editing shared files in a collaborative space are provided. A non-limiting example includes a server computing device for allowing a user to privately edited shared files in a collaborative space. The server computing device includes an interface engine configured to generate a user interface. The user interface includes a listing of a plurality of shared files accessible in the collaborative space and an edit privately control to privately edit an identified shared file of the plurality of shared files. When the edit privately control is actuated, the server computing device generates a personal copy of the identified shared file and updates metadata associated with the identified shared file to indicate that the personal copy has been generated.

17 Claims, 18 Drawing Sheets

(56) References Cited

U.S. PATENT DOCUMENTS

| | | | | |
|---|---|---|---|---|
| 2011/0055177 | A1* | 3/2011 | Chakra | G06Q 10/109 707/695 |
| 2012/0192055 | A1* | 7/2012 | Antebi | G06F 16/1834 715/229 |
| 2013/0013560 | A1* | 1/2013 | Goldberg | G06Q 10/101 707/634 |
| 2013/0226876 | A1 | 8/2013 | Gati et al. | |
| 2013/0275509 | A1 | 10/2013 | Micucci et al. | |
| 2013/0282830 | A1 | 10/2013 | Besen et al. | |
| 2014/0082071 | A1 | 3/2014 | Rexer | |
| 2014/0122592 | A1 | 5/2014 | Houston et al. | |
| 2014/0358860 | A1* | 12/2014 | Wautier | G06F 16/27 707/638 |
| 2015/0082245 | A1 | 3/2015 | Mi et al. | |
| 2015/0288774 | A1 | 10/2015 | Larabie-Belanger | |
| 2016/0321291 | A1* | 11/2016 | Malhotra | G06F 12/0891 |
| 2017/0075919 | A1* | 3/2017 | Bose | G06F 21/6245 |
| 2017/0366639 | A1* | 12/2017 | Oscherov | G06F 15/173 |

OTHER PUBLICATIONS

"Files", Retrieved on: Aug. 11, 2015 Available at: https://eroom.un.org/eRoomHelp/en/files.htm.

"Versioning Models", Published on: Nov. 9, 2006 Available at: http://tortoisesvn.net/docs/release/TortoiseSVN_en/tsvn-basics-versioning.html.

"Dropbox modification of file in 2 different places at once", Published on: Jan. 17, 2013 Available at: http://superuser.com/questions/502549/dropbox-modification-of-file-in-2-different-places-at-once.

"Overview of Sharing and Collaborating on Excel Data", Retrieved on: Aug. 11, 2015 Available at: https://support.office.com/en-za/article/Overview-of-sharing-and-collaborating-on-Excel-data-3c4fb64f-bf46-42a4-9f6a-73cc6367d378.

"FileCloud", Published on: Mar. 25, 2015 Available at: https://www.getfilecloud.com/tour/.

PCT International Search Report and Written Opinion in International Application PCT/US2016/061805, dated Mar. 6, 2017, 13 pgs.

"International Preliminary Report on Patentability Issued in PCT Application No. PCT/US2016/061805", dated Jan. 29, 2018, 10 Pages.

"Second Written Opinion Issued in PCT Application No. PCT/US2016/061805", dated Jul. 6, 2017, 9 Pages.

"Office Action Issued in European Patent Application No. 16801364.7", dated Mar. 26, 2020, 7 Pages.

"Summons to Attend Oral Proceedings Issued in European Patent Application No. 16801364.7", dated Nov. 10, 2020, 9 Pages.

"Office Action Issued in European Patent Application No. 16801364.7", dated Nov. 5, 2019, 6 Pages.

"Office Action Issued in European Patent Application No. 16801364.7", dated Apr. 30, 2021, 11 Pages.

"First Office Action Issued in Chinese Patent Application No. 201680067698.6", dated Jul. 1, 2021, 12 Pages.

"Office Action and Search Report Issued in European Patent Application No. 16801364.7", dated Apr. 30, 2021, 11 Pages.

* cited by examiner

PRIVATE EDITING OF SHARED FILES

BACKGROUND

Files may be stored in a collaborative space. A collaborative space is a location where multiple users can share files to, for example, collaborate on a project. The collaborative space may be accessible to users via a network. And multiple users may be able access and edit files shared in the collaborative space. Examples of collaborative spaces includes shared folders and team sites such as SharePoint® from Microsoft Corporation of Redmond, Wash.

Typically, users of a collaborative space may edit the files stored therein with an appropriate application. For example, if a presentation file is stored in a collaborative space a user may edit the file using a presentation editing program. The presentation editing program may be a traditional application that runs directly on the computing device. Alternatively, the presentation editing program may be a web-based application that is provided by a web server and runs in a web browser.

SUMMARY

Non-limiting examples of the present disclosure describe privately editing shared files in a collaborative space. In an example, a server includes a private edit engine that manages access to shared files and generates private copies of the shared files for users in response to requests to privately edit the shared files. Other examples are also described.

A first aspect is a server computing device for allowing a user to privately edit shared files in a collaborative space, comprising: an interface engine configured to generate a user interface comprising: a listing of a plurality of shared files accessible in the collaborative space; and an edit privately control to privately edit an identified shared file of the plurality of shared files; wherein when the edit privately control is actuated, the server computing device generates a personal copy of the identified shared file and updates metadata associated with the identified shared file to indicate that the personal copy has been generated.

Another aspect is a method of managing private editing of a shared file, the method comprising: generating a user interface screen comprising a listing of a plurality of shared files accessible in a collaborative space; receiving a request from a user to privately edit an identified shared file from the plurality of shared files; generating a personal copy of the identified shared file; and updating metadata associated with the identified shared file to indicate that the personal copy has been generated.

Yet another aspect is a server computing device for allowing a user to privately edit shared files in a collaborative space, comprising: an interface engine configured to generate a user interface comprising: a listing of a plurality of shared files accessible in the collaborative space comprising a plurality of file-identification controls operative to identify a shared file from the plurality of shared files; and an edit privately control to privately edit an identified shared file of the plurality of shared files configured to be displayed upon actuation of one of the plurality of file identification controls; and a personal copy engine configured to when the edit privately control is actuated: identify a personal storage location provided by a network-based storage server associated with the user; generate a personal copy of the identified shared file in the identified personal storage location; and update metadata associated with the identified shared file to store the identity of the user and a timestamp comprising the date and time that the personal copy was generated.

Examples are implemented as a computer process, a computing system, or as an article of manufacture such as a computer program product or computer readable media. According to an aspect, the computer program product is a computer storage media readable by a computer system and encoding a computer program of instructions for executing a computer process.

This summary is provided to introduce a selection of concepts in a simplified form that are further described below in the detailed description. This summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 7 shows an example user interface screen for viewing a listing of shared files and for requesting to privately edit one of the shared files generated by embodiments of the system of FIG. 1.

FIG. 13 shows an example user interface screen for communicating to a user that the shared file was modified after the personal copy was made and prompting the user about how to publish the personal copy generated by embodiments of the system of FIG. 1.

FIG. 14 shows an example user interface screen for a user to view files stored in a personal storage location and to confirm publication of a personal copy of a shared file stored therein generated by embodiments of the system of FIG. 1.

DETAILED DESCRIPTION

Figure 1:
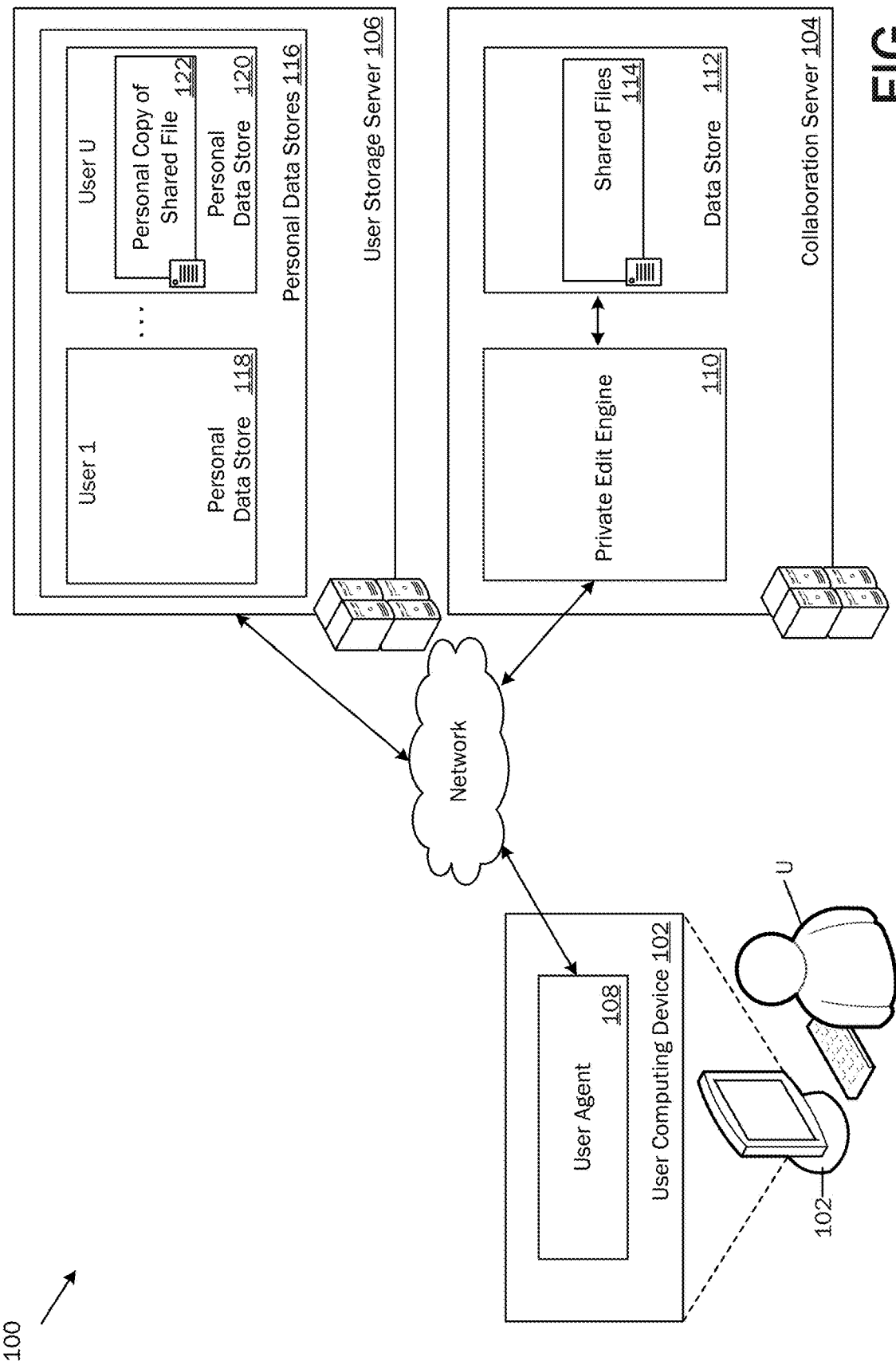
FIG. 1 is a simplified block diagram of one example of a system for privately editing shared files.

The present disclosure describes private editing of shared files. The shared files may be stored in a collaborative space on a server that is accessible to multiple users. User may edit the files in the collaborative space. Sometimes a user desires to edit the file without immediately sharing the edits with all of the other users. For example, if a user is making extensive updates to a file, the user may wish to privately edit the file for a period of time in order to complete the updates. After the user is done making the updates, the user may then want to share the updated file with the other users. If intermediate changes made by the user are shared with the other users, the other user may be exposed to an inconsistent and non-final file.

In some version management systems, a user must check out a file before editing it. When the file is checked out, other users cannot edit it. After the user is done editing the file, the user can check the file back in to make the changes available to the other users. Unfortunately, while the file is checked out, other users are typically completely blocked out of the file and cannot modify it at all. Thus, the check-in/check-out option is not very collaborative.

Alternatively, a user can manually create a local copy of a shared file from the collaborative space. For example, the local copy may be made on the desktop of the user's computer. The user can then edit the local copy of the file as necessary. After the user has finished editing the file, the user can copy the local file over the shared file in the collaborative space to make the edited version available to other users. Unfortunately, during the time the user is working on the local copy of the file, other users might edit the shared copy of the filing without even knowing about the user's local copy. When the user copies the shared file back to the collaborative space, any changes made by other users will be lost and the user is unlikely to even know about the lost changes. Accordingly, making and editing a local copy of a shared file is not ideal.

In some embodiments of the system for private editing of shared files described below, at least some of the above-mentioned drawbacks are overcome. The system makes a personal copy of a shared file in response to a request from the user. The personal copy may be made in a personal storage space associated with the user, such as a personal storage space provided by a network-based storage service. When the personal copy is made, metadata associated with the personal copy is updated to indicate that the personal copy has been made. The metadata may also indicate who made the personal copy and when the personal copy was made. When other users attempt to access the shared file, the system may generate a user interface to inform the user of the personal copies of the file and to prompt the user regarding whether to proceed with accessing the shared file. In this manner, the other user can decide whether to access the file (and potentially make changes to the file) with knowledge about the personal copy.

Additionally, the user can publish the edited version of the personal copy back to the collaborative space. In this manner, the user's edits will be available to other users only when the user decides the file is ready. At the time the user publishes the personal copy, the system may determine whether the shared file was edited after the personal copy was made. If the shared file was edited after the personal copy was made, the system will generate a user interface to present information to the user about the changes to the shared file and to prompt the user about how to proceed. The user may elect to overwrite the changes to the shared file or merge the edited personal copy with the changes shared file. Beneficially, the system provides the user with information about changes to the shared file rather than just overwriting the shared file.

FIG. 1 is a simplified block diagram of one example of a system 100 for privately editing shared files. As illustrated in FIG. 1, the system 100 includes a user computing device 102 that is operable by a user U, a collaboration server 104, and a user storage server 106. The user computing device 102, the collaboration server 104, and the user storage server 106 communicate over a network.

The user computing device 102 includes a user agent 108. The user agent 108 allows the user to interact with the files, such as shared files. In some embodiments, the user agent 108 is an application running on the user computing device 102 that interacts with one or both of the collaboration server 104 and the user storage server 106. Additionally, the user agent 108 may be a component of an operating system running on the user computing device 102. In some examples, the user agent 108 is a browser application operable to generate interactive graphical user interfaces based on content served by the collaboration server 104 or the user storage server 106. According to an example, an extension is installed on the user computing device 102 as a plug-in or add-on to the browser application (i.e., user agent 108) or is embedded in the browser application.

The collaboration server 104 operates to provide network-based services, including file sharing and collaboration services. Non-limiting examples of network-based services provided by the collaboration server 104 include Share-Point® team collaboration services from Microsoft Corporation of Redmond, Wash. Additional examples of network-based services include web-based document storage and editing services such as Google for Work enterprise services from Google Inc. of Mountain View, Calif. and Polaris Office from Polaris Office, Inc of Seoul, Korea, and network-based file sharing services such as Box from Box Inc. of Los Altos, Calif., Dropbox from DropBox, Inc of San Francisco, Calif., Syncplicity from Syncplicity LLC of Santa Clara, Calif., and other network-based file sharing services.

As illustrated in FIG. 1, the collaboration server 104 comprises a private edit engine 110 and a data store 112. The private edit engine 110 operates to interact with the user agent 108 and provide access, including access to perform private editing, to shared files 114 stored in the data store 112.

The data store 112 operates to store files and other data and may comprise one or more file systems and databases such as relational databases. The data store 112 may comprise one or more server computing devices. In some embodiments, the data store 112 may comprise a distributed database or a distributed file system.

The user storage server 106 operates to store files for users. In some embodiments, the user storage server 106 operates to store files for multiple users. The user storage server 106 may include personal data stores 116, each of which may be associated with at least one particular user. As illustrated in FIG. 1, the user storage server 106 includes a personal data store 118 associated with a user 1, and a personal data store 120 associated with the user U. Embodiments of the user storage server 106 may include any number of personal data stores 116. In some embodiments, the user storage server 106 is configured to limit access to the personal data stores 116 and the files stored therein to an associated user (e.g., access to the personal data store 118 may be limited to the user 1, access to the personal data store 120 may be limited to the user U, etc.). In some embodiments, a user may be able to permit other users to access at least some of the files in the personal data store.

In some embodiments, the user storage server 106 is provided by a network-based storage server such as OneDrive from Microsoft Corporation of Redmond, Wash., Google Drive from Google Inc. of Mountain View, Calif., Box from Box Inc. of Los Altos, Calif., Dropbox from DropBox, Inc of San Francisco, Calif., Syncplicity from Syncplicity LLC of Santa Clara, Calif., and other network-based file sharing services.

In the example shown in FIG. 1, the personal data store 120 associated with the user U stores a personal copy 122 of a shared file. This personal copy 122 was created by the private edit engine 110 based on a request from the user agent 108.

Although FIG. 1 shows the collaboration server 104 and the user storage server 106 as separate servers, in some embodiments the collaboration server 104 and the user storage server 106 are the same server. Further, as used herein a server may comprise one or more computing devices, including one or more server farms, which may be located anywhere, including in proximity to the user computing device 102 or distributed in various locations throughout the world.

Figure 2:
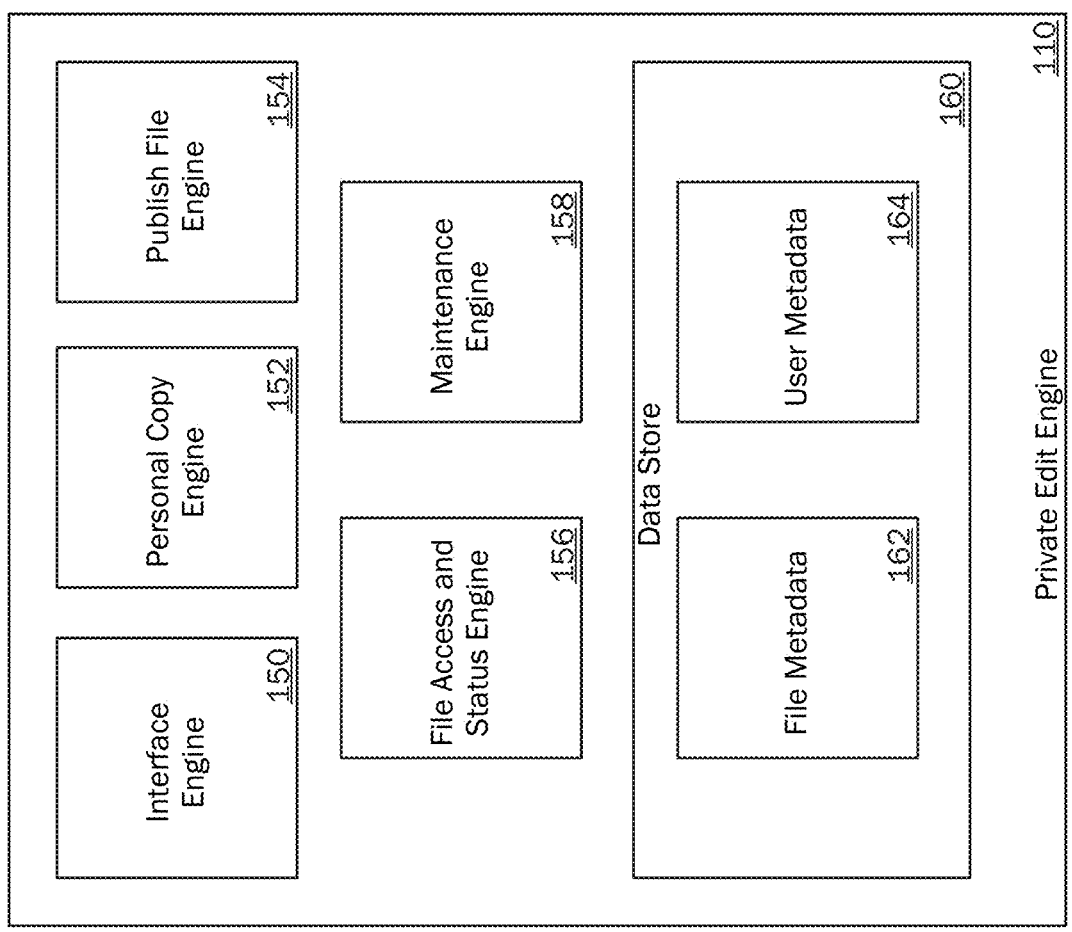
FIG. 2 illustrates an embodiment of the private edit engine of FIG. 1.

FIG. 2 illustrates an embodiment of the private edit engine 110. In some embodiments, the private edit engine 110 includes an interface engine 150, a personal copy engine 152, a publish file engine 154, a file access and status engine 156, a maintenance engine 158, and a data store 160.

The interface engine 150 communicates with the user agent 108 and the user storage server 106 to send and receive requests, commands, data, etc. In some embodiments, the interface engine 150 receives requests that relate to the shared files 114 or a personal copy of a shared file. For example, the interface engine 150 may receive a request to create a personal copy of a shared file for a particular user. In response, the interface engine 150 may transmit a copy of the shared file to the user storage server 106 for storage in a personal data store associated with the user.

Additionally, in some embodiments, the interface engine 150 generates user interfaces for users to interact with the private edit engine 110. In at least some embodiments, the interface engine 150 generates data or files that are transmitted to the user agent 108 for presentation to the user U. For example, the interface engine 150 may generate files formatted in a markup language such as hypertext markup language (HTML) or extensible hypertext markup language (XHTML). The interface engine 150 may also generate files in a client-side scripting language such as JavaScript, ActionScript, Dart, VBScript, or Typescript. The interface engine 150 may also generate other types of files. Further, in some embodiments, the interface engine 150 transmits existing files to the user agent 108. The existing files may be markup language files, client-side script files, image files, stylesheet files, video files, document files, or any other type of files. In some embodiments, the user interface engine comprises a web server such as Internet Information Services (IIS) from Microsoft Corporation of Redmond, Wash., Apache HTTP Server from the Apache Software Foundation of Forest Hill, Md., Nginx from Nginx, Inc. of San Francisco, Calif., Google Web Server from Google Inc. of Mountain View, Calif., and other web servers.

The personal copy engine 152 operates to create a personal copy for a user of one or more of the shared files stored in the data store 112. In some embodiments, the personal copy is stored in a personal data store associated with the user on the user storage server 106. The personal copy may be private such that access is limited to a particular user, public such that many users can access the file, or semi-private such that a defined group of users can access the file. Operations of the personal copy engine 152 are further illustrated and described with respect to at least FIG. 3.

The publish file engine 154 operates to publish privately edited files such as personal copies of shared files. For example, after a user has completed privately editing a personal copy of a file, the publish file engine may publish the file to the collaboration server 104 (e.g., by replacing a previous version of a shared file in the data store 112). Operations of the publish file engine 154 are further illustrated and described with respect to at least FIG. 5.

The file access and status engine 156 operates to provide access to shared files and to determine the status of the shared files 114. For example, the file access and status engine 156 may provide access to a user wishing to view or edit the shared file. In some embodiments, the file access and status engine 156 coordinates access to the shared files with any personal copies of the shared files. Additionally, the file access and status engine 156 may determine how many personal copies of a particular one of the shared files 114 currently exist. In some embodiments, the file access and status engine 156 also operates to determine whether a personal copy of a shared file has been privately edited. Operations of the file access and status engine 156 are further illustrated and described with respect to at least FIG. 4.

The maintenance engine 158 maintains the shared files 114. In some embodiments, the maintenance engine 158 evaluates the metadata associated with the shared files. In at least some embodiments, the maintenance engine 158 comprises one or more scheduled tasks that perform maintenance operations on the shared files. An example maintenance operation is evaluating the age of personal copies (e.g., how long ago the personal copy was made) and, in some embodiments, retrieving personal copies that are older than a predefined duration. As another example maintenance operation, the personal data stores are queried to determine a last modified date for personal copies of the shared files, which may then be stored in the data store 160. Beneficially, by storing the last modified date of personal copies of shared files in the data store 160, the last modified data can be presented to users without the potential delay that may be associated with querying the personal data stores 116.

The data store 160 operates to store files and other data and may be similar to the data store 112. In some embodiments, the data store 160 stores the file metadata 162 and the user metadata 164. As an example, the file metadata may include various information about the shared files 114, including whether any personal copies have been made, the identity of users associated with the personal copies, when (e.g., a timestamp) the personal copies were made, and when the personal copies were last edited. Examples of the user metadata 164 include the location of an associated personal data store and access information for that personal data store such as a protocol type, authentication information, etc. In some embodiments, the data store 160 stores additional or different data as well.

Figure 3:
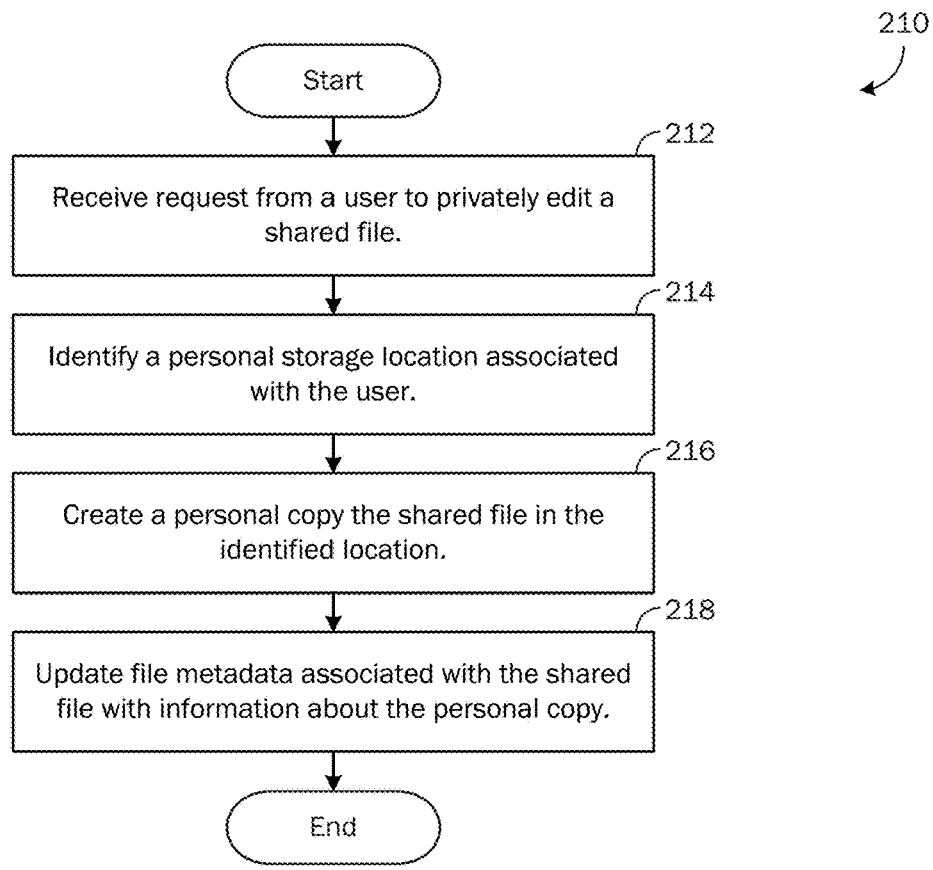
FIG. 3 illustrates an exemplary method for generating a personal copy of a shared file performed by embodiments of the system of FIG. 1.

FIG. 3 illustrates an exemplary method 210 for generating a personal copy of a shared file. As an example, the method 210 may be executed by a component of an exemplary system such as the system 100. For example, the method 210 may be performed by the personal copy engine 152. In examples, the method 210 may be executed on a device comprising at least one processor configured to store and execute operations, programs, or instructions.

At operation 212, a request to privately edit a shared file is received from a user. For example, the request may be transmitted by the user agent 108 to the private edit engine 110 based on an input from the user. In some embodiments, the user makes the request by actuating (e.g., touching a touch screen display panel or clicking using a mouse or another type of user input device) a user-actuatable interface element of a user interface screen generated by the user agent 108 and displayed on the user computing device 102. For example, the user may select an "Edit Privately" option from a menu displayed after the user has identified a particular shared file. An example user interface screen for requesting to privately edit a file is illustrated and described with respect to at least FIG. 7.

At operation 214, a personal storage location associated with the user is identified. In some embodiments, the personal storage location is identified based on data stored in the user metadata 164. For example, the metadata may identify one of the personal data stores 116 of the user storage server 106. Additionally, in some embodiments, a user may specify a personal storage location in which a personal copy of the shared file should be stored. An example user interface screen for identifying a personal storage location for a personal copy of a shared file is illustrated and described with respect to at least FIG. 8.

At operation 216, a personal copy of the shared file is created in the identified personal storage location. In some embodiments, the personal copy is created by transmitting the shared file to the user storage server 106 along with information to specify the identified personal storage location and how the file should be stored therein (e.g., a particular directory path, file name, access permissions, etc.).

At operation 218, the file metadata 162 associated with the shared file is updated. In some embodiments, a record is created in the file metadata 162 that indicates that the personal copy has been made. The record may include the identity of the shared file, the identity of the user, the location of the personal copy, and a timestamp indicating when the personal copy was made. In some embodiments, in addition to updating the metadata, other users who are currently accessing the shared file or who have made personal copies of the shared file are notified that the personal copy has been made. This notification may comprise an e-mail, an SMS message, a popup message in an application (such as a web-based application for accessing and editing the shared file), or any others means of notifying the other users.

Figure 4:
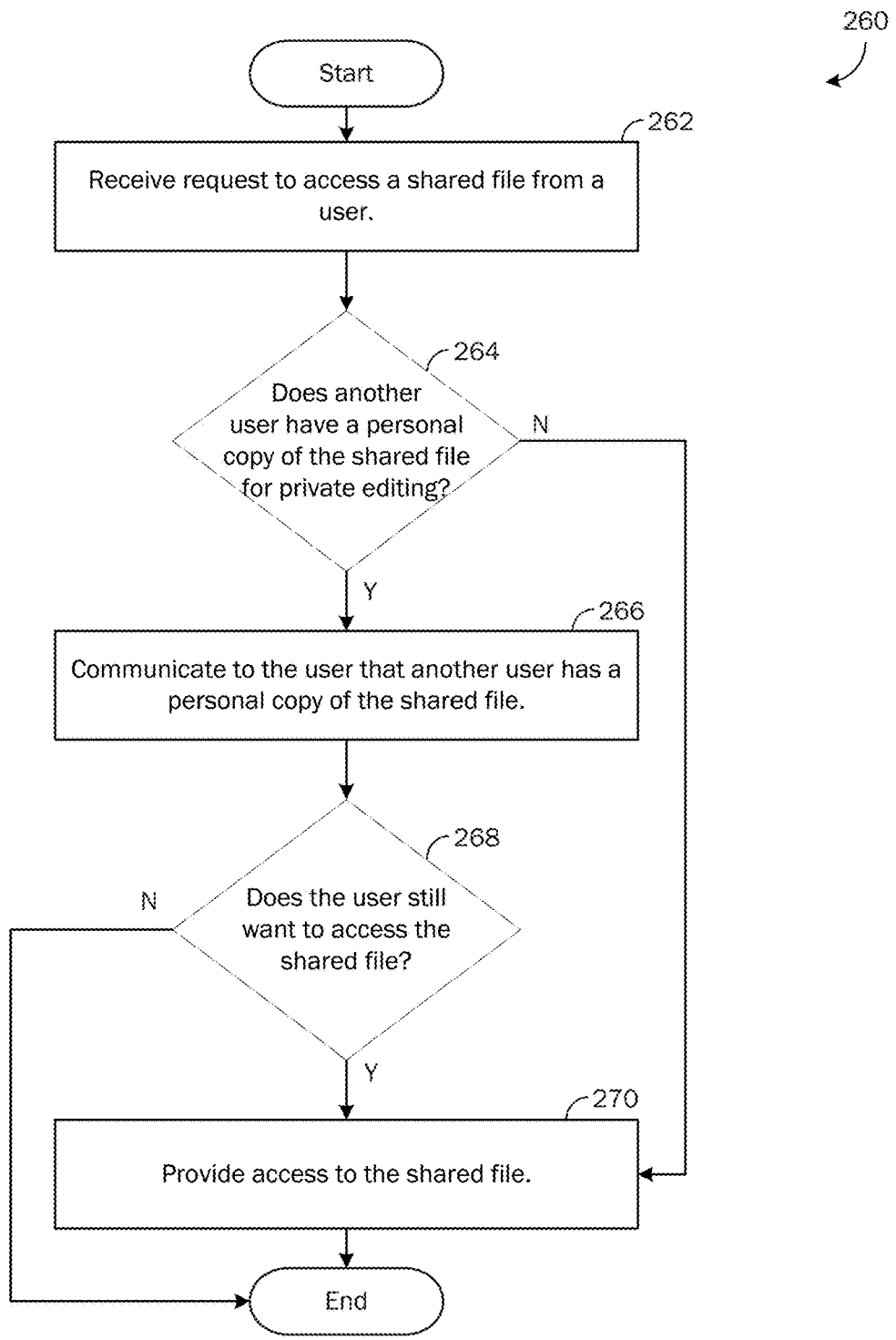
FIG. 4 illustrates an exemplary method for accessing a shared file performed by embodiments of the system of FIG. 1.

FIG. 4 illustrates an exemplary method 260 for accessing a shared file. As an example, the method 260 may be executed by a component of an exemplary system such as the system 100. For example, the method 260 may be performed at least in part by the file access and status engine 156 as well as other components of the file status engine. For example, some embodiments of the collaboration server 104. In examples, the method 260 may be executed on a device comprising at least one processor configured to store and execute operations, programs, or instructions.

At operation 262, a request is received from a user to access a shared file. In some embodiments, the request may be for access either to read or to edit the shared file. Additionally, in some embodiments, the user may request to move or copy the shared file. Further, the request from the user may be a request to privately edit the shared file.

In some embodiments, the request is sent by the user agent 108 based on an input from the user. For example, the user may select a menu option to open, download, or move the shared file. The menu option may be selected by actuating a user-actuatable interface element of a user interface screen generated by the user agent 108 and displayed on the user computing device 102. Alternatively, the request is sent by actuating a button or another type of user interface element.

At operation 264, it is determined whether another user has a personal copy of the shared file for private editing. If another user does have a personal copy of the file, the method 260 proceeds to operation 266. If not, the method proceeds to operation 270.

At operation 266, it is communicated to the user that another user has a personal copy of the file. The communication to the user may include, for example, the name of or other identifying information related to the other user. Additionally, the communication may include the date and time the personal copy was made as well as whether the personal copy has been privately edited and, if so, when the personal copy was last (i.e., most recently) privately edited. In some embodiments, the information about the personal copy of the shared file is retrieved from the file metadata 162. Additionally, in some embodiments, the information about the personal copy is retrieved from the user storage server 106. Further, in some embodiments, multiple users may store personal copies of the same shared file at the same time. In these embodiments, the information presented to the user may indicate that multiple users have created personal copies of the shared file. Beneficially, this information may allow a user to determine whether to access the current version of the file or whether to wait for the other user/s to publish the personal copies back to the shared file. The user may also use the information to contact the other user to inquire about the status of the shared file. An example user interface screen for communicating information to a user about existing personal copies of a shared file is illustrated and described with respect to at least FIG. 10.

At operation 268, it is determined whether the user still wants to access the file even though the personal copies exist. If so, the method 260 continues to operation 270. Otherwise, the method 260 ends.

At operation 270, the user is provided access to the requested shared file. Depending on the type of access the user has requested, providing access may comprise transmitting the shared file to the user agent 108 or to the user storage server 106. Additionally, in some embodiments, access may be provided through a web-based application interface provided by the collaboration server 104. An example user interface screen for accessing a shared file that is being privately edited through a web-based application interface is illustrated and described with respect to at least FIG. 11.

Figure 5:
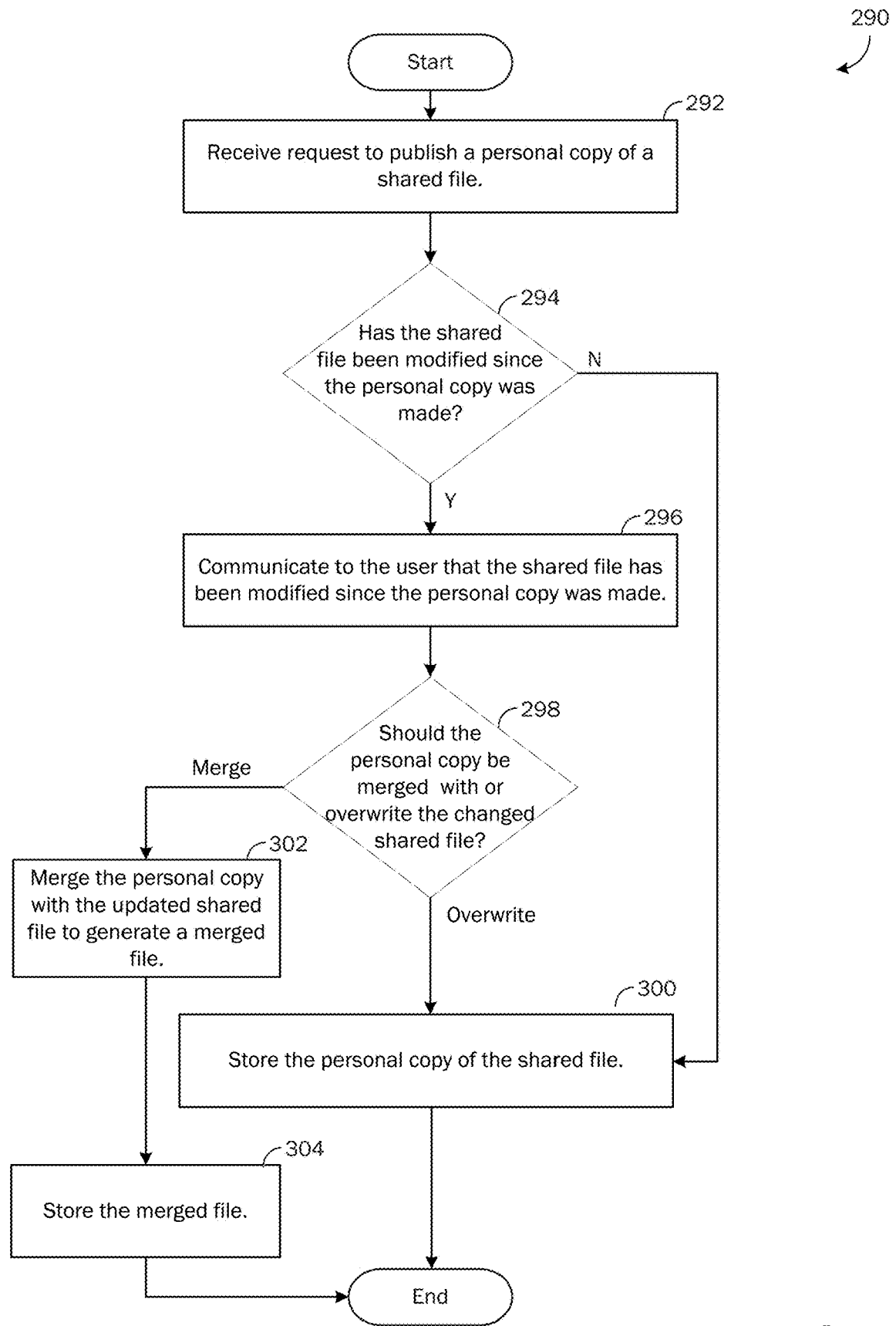
FIG. 5 illustrates an exemplary method for publishing a personal copy of a shared file performed by embodiments of the system of FIG. 1.

FIG. 5 illustrates an exemplary method 290 for publishing a personal copy of a shared file. As an example, the method 290 may be executed by a component of an exemplary system such as the system 100. For example, the method 290 may be performed by the publish file engine 154. In examples, the method 290 may be executed on a device comprising at least one processor configured to store and execute operations, programs, or instructions.

At operation 292, a request is received from a user to publish a personal copy of a shared file. In some embodiments, the request is sent by the user agent 108 based on an input from the user. For example, the user may select a menu option to publish the personal copy. The menu option may be selected by actuating a user-actuatable interface element of a user interface screen generated by the user agent 108 and displayed on the user computing device 102. Alternatively, the request is sent by actuating a button or another type of user interface element. In some embodiments, the menu options or other types of user interface elements to publish the personal copy are only available when the user has made or saved private edits to the personal copy. An example user interface screen for a user to request to publish a personal copy of a shared file is illustrated and described with respect to at least FIG. 12.

At operation 294, it is determined whether the shared file has been modified since the personal copy of the shared file was made. In some embodiments, determining whether the shared file has been modified comprises comparing the last edit date of the shared file to the date the personal copy of the shared file was made. Additionally, in some embodiments, determining whether the shared file has been modified comprises comparing a version number associated with the personal copy to a version number associated with the shared file. Additionally, in some embodiments, determining whether the shared file has been modified comprises comparing a signature (e.g., a Rivest-Shamir-Adleman (RSA) or Digital Signature Algorithm (DSA) signature) of the shared file to a signature of the shared file at the time the personal copy was made, which may be stored in the file metadata 162, alongside the personal copy of the shared file (or elsewhere) in a personal data store associated with the user, or elsewhere. If it is determined that the shared file has been modified, the method 290 proceeds to operation 296. Otherwise, the method 290 proceeds to operation 302.

At operation 296, it is communicated to the user that the shared file was modified after the personal copy was made. In addition to informing the user that the shared file has been modified, the communication may include, for example, a list of the dates and times changes were made and of who made the changes. Some embodiments also include version numbers corresponding to the changes and may include user-actuatable elements to view the changed file (or the portions of the file that have been changed). An example user interface screen for communicating to a user that the shared file was modified after the personal copy was made is illustrated and described with respect to at least FIG. 13.

At operation 298, it is determined whether the personal copy should be merged with the shared file or if the personal copy should overwrite (i.e., replace) the shared file. Although overwriting the shared file may cause the changes to the shared file to be discarded, some embodiments, save the personal copy as a new version. In these embodiments, changes that appear to be lost can be recovered by reverting to a previous version of the shared file. In some embodiments, the determination of whether to overwrite or merge is made based on prompting the user. For example, the communication to the user described in operation 296 may include a user prompt to indicate whether to merge or overwrite the shared file. Additionally, in some embodiments, a conflict-resolution setting is evaluated to determine whether to merge, overwrite, or prompt the user. In some embodiments, the conflict-resolution setting is stored in the file metadata 162 and defines the conflict-resolution behavior for a particular file. Additionally, in some embodiments, the conflict-resolution setting is stored in the user metadata and defines the conflict-resolution behavior for changes published by a particular user. As another example, the conflict-resolution setting is stored on the collaboration server 104 and may define the conflict-resolution behavior setting for all or some of the files stored on the collaboration server 104.

If it is determined that the updated shared file should be overwritten with the personal copy of the shared file, the method 290 continues to operation 300. If instead it is determined that the personal copy should be merged with the updated shared file, the method 290 continues to operation 302.

At operation 300, the personal copy of the shared file is stored on the collaboration server 104. In some embodiments, the personal copy of the shared file is stored as a new version of the shared file (e.g., if the updated version of the shared file is version 2, the stored version of the personal copy of the shared file may be version 3).

At operation 302, the changes from the shared file are merged into the personal copy of the shared file. Various techniques may be used to merge the files. In some embodiments, the specific technique used to merge the file may depend on the file type. For example, a Microsoft Word document may be merged using a merge process within the Microsoft Word application, while a Microsoft Excel document may be merged using a merge process within the Microsoft Excel application. Other types of files may be merged using other processes as well. Additionally, some types of files may not be suitable for merging; in such case, the merge may fail and the user may be advised to overwrite the file instead.

The merge may be performed by the collaboration server 104. Additionally, in some embodiments, the user agent 108 may perform the merge. For example, the collaboration server 104 may transmit a copy of the changed shared file to the user agent 108 and then the user agent 108 will merge the changed shared file with the personal copy of the shared file. Alternatively, in some embodiments, the collaboration server 104 transmits the changes to the shared file (e.g., by comparing the version of the shared file that was used to make the personal copy with the updated shared file) rather than the entire changed shared file. The user agent 108 then merges the changes into the personal copy of the shared file to generate the merged file.

At operation 304, the merged file on the collaboration server 104. In some embodiments, the merged file is stored as a new version of the shared file (e.g., if the updated version of the shared file is version 2, the stored version of the personal copy of the shared file may be version 3).

Figure 6:
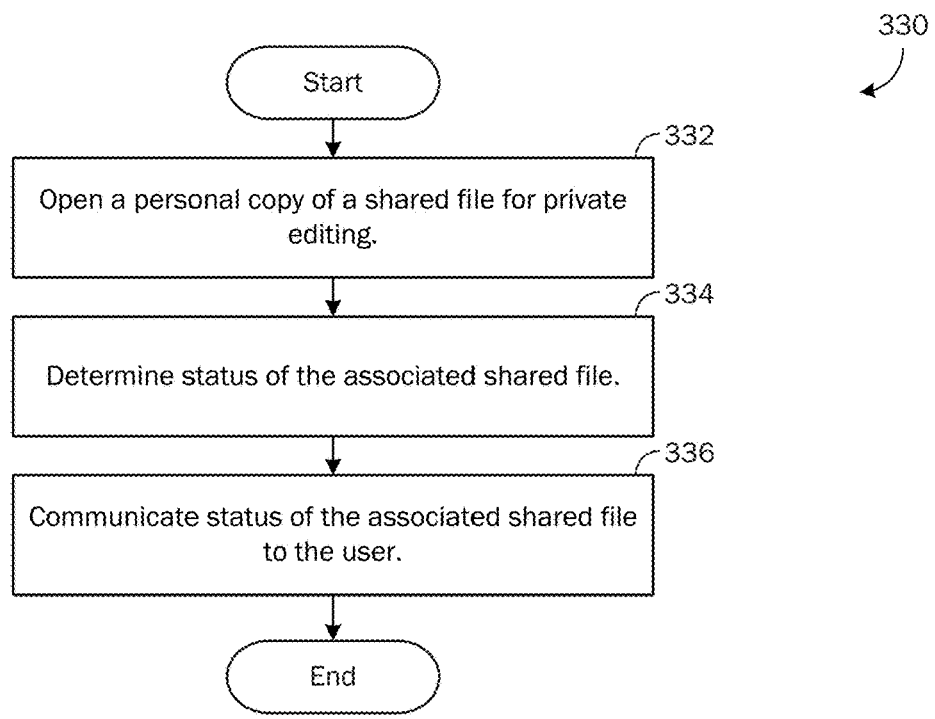
FIG. 6 illustrates an exemplary method for opening a shared file performed by embodiments of the system of FIG. 1.

FIG. 6 illustrates an exemplary method 330 for opening a shared file. As an example, the method 330 may be executed by a component of an exemplary system such as the system 100. For example, the method 330 may be performed, at least in part, by the file access and status engine 156. In examples, the method 330 may be executed on a device comprising at least one processor configured to store and execute operations, programs, or instructions.

At operation 332, a personal copy of a shared file is opened for private editing. In at least some embodiments, the personal copy is opened by actuating a user-actuatable control associated with the personal copy on a user interface screen. An example user interface screen that includes a list of user-actuatable controls associated with various files, including personal copies of shared files, is illustrated and described with respect to at least FIG. 12.

In some embodiments, the personal copy of the shared file may be opened by the user agent 108 or an application running on the user computing device 102. Additionally, in some embodiments, the web personal copy of the shared file is opened by a web-based file editing application such as Office Online from Microsoft Corporation of Redmond, Wash.

At operation 334, the status of the shared file associated with the personal copy is determined. Determining the status of the associated shared file may comprise determining one or more of whether the shared file has been modified after the personal copy was made, whether additional personal copies of the shared file have been made, and whether any personal copies of the shared files have been modified.

At operation 336, the determined status is communicated to the user. The communication to the user may include any of the status information determined at operation 334. The status information may communicated in a pop-up message, in a toolbar displayed by the application that opens the document, or otherwise. An example user interface screen for communicating information to a user about existing personal copies of a shared file is illustrated and described with respect to at least FIG. 11.

Although the method 330 is described in terms of opening a personal copy of a shared file for private editing, embodiments include similar methods to determine the status of shared files that are opened for either viewing or editing. For example, these embodiments, may communicate the status of a personal copy to the user upon viewing an associated shared file. Additionally, in some embodiments, a method similar to the method 330 operates to determine and communicate the status of one or more files listed in a file directory or listing.

Figure 7:
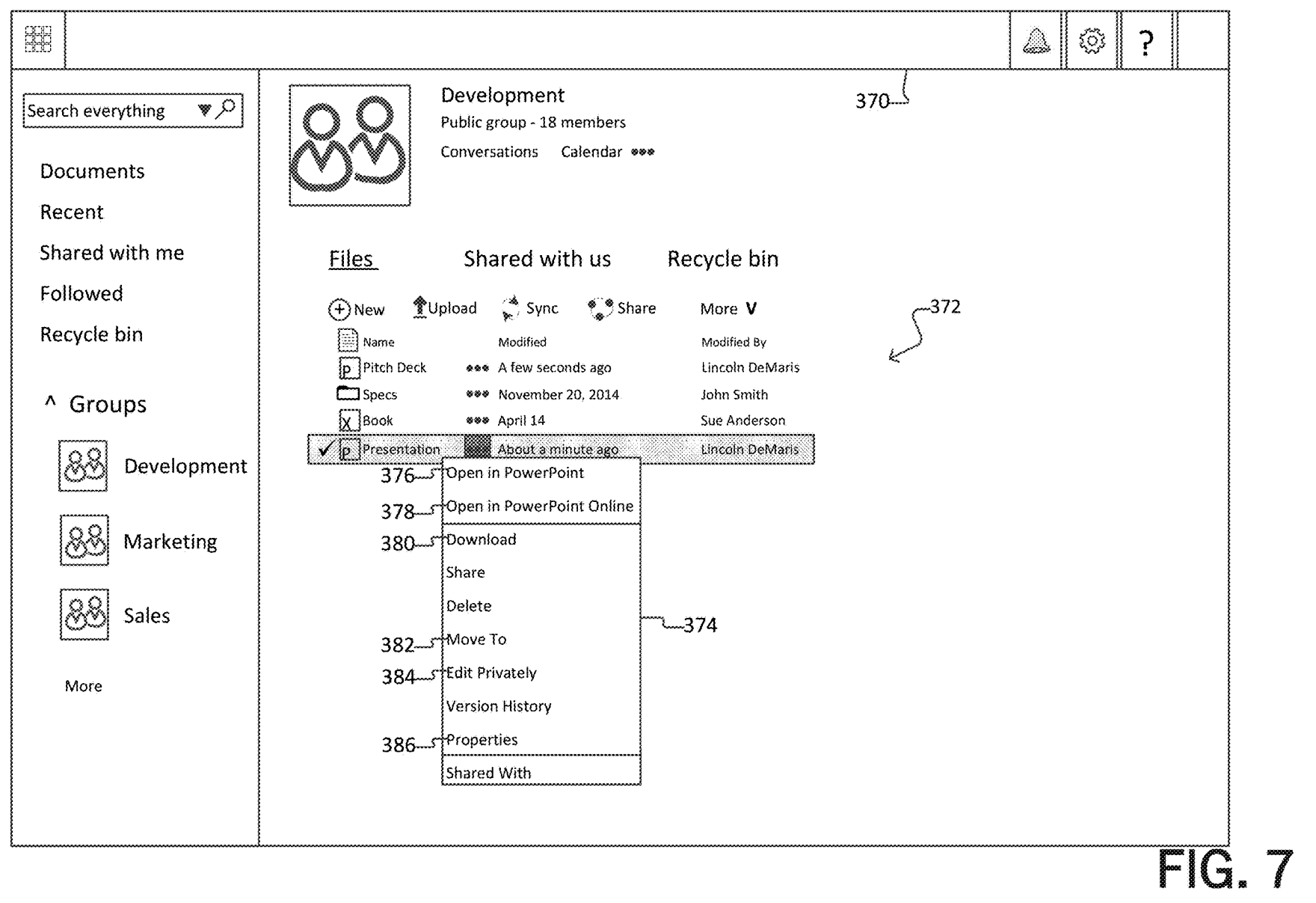

FIG. 7 shows an example user interface screen 370 for viewing a listing of shared files and for requesting to privately edit one of the shared files. In some embodiments, the user interface screen 370 is displayed by the user computing device 102. In some embodiments, the user interface screen 370 is generated by the user agent 108 based at least in part on information transmitted by the collaboration server 104.

In this example, the user interface screen 370 includes a listing 372 and a menu 374. The listing 372 includes a list of items. The list of items may include files and directories. In some embodiments, the listing 372 includes items corresponding to all of the files and directories in a particular directory. The listing 372 displays various information about the items such as an item type, a name, last modified date, and an identifier of the user who last modified the file. In other embodiments, the listing 372 may include additional or different information as well. In at least some embodiments, the items in the listing 372 comprise file-identification controls that can be actuated by a user to identify a particular file from the listing 372. Upon actuation of one of the items, a menu may be displayed on the interface such as the menu 374.

The menu 374 is an example menu that may be displayed as a pop-up menu when a particular associated item in the listing 372 is actuated. The menu 374 includes a variety of actions that may be performed with respect to the particular associated item. In this example, the menu 374 includes an open control 376, an open online control 378, a download control 380, a move to control 382, an edit privately control 384, and a properties control 386 among others. The open control 376, open online control 378, download control 380, move to control 382 are examples of access file controls.

Upon actuation, the open control 376 operates to open the associated item using a client-based application such as PowerPoint from Microsoft Corporation of Redmond, Wash. In some embodiments, the associated file is transmitted to the user agent 108 where it is stored at least temporarily on the user computing device 102.

Upon actuation, the open online control 378 operates to open the associated item using a web-based application such as PowerPoint Online from Microsoft Corporation of Redmond, Wash. In some embodiments, the web-based application is provided by the collaboration server 104. In other embodiments, the web-based application is provided by another server and the associated item is transmitted to the other service so it can be accessed by the web-based application.

Upon actuation, the download control 380 operates to request and save a copy of the associated item (e.g., a shared file) on the user computing device 102 or in another location specified by the user. In some embodiments, in response to actuation of the download control 380, a pop-up prompt is displayed in which the user can specify the location.

Upon actuation, the move to control 382 operates to move the associated item to another location specified by the user (e.g., through a pop-up prompt that may be displayed in response to actuation of the move to control 382). In some embodiments, the associated file is moved to another directory stored on the collaboration server 104. Additionally, in some embodiments, the associated file can be moved to another server or elsewhere.

Upon actuation, the edit privately control 384 operates to generate a personal copy of the associated item for private editing. In some embodiments, the edit privately control 384 is displayed for only certain associated items. For example, the edit privately control 384 may be displayed on the menu 374 when the associated item is a file but not when the associated item is a directory. Further, the edit privately control 384 may be displayed on the menu 374 for only certain types of files or files with a particular permission level. Various operations related to generating and using personal copies of files are described throughout.

Upon actuation, the properties control 386 operates to display information about the associated item. In various embodiments, various properties are displayed. For example, in some embodiments, properties relating to a creation date, a last modified date, a last modified by user, a size, and a version number are displayed. Additionally, in some embodiments, properties relating to personal copies of the shared file are displayed. For example, a list of any personal copies that have been made may be shown, as well as who made each of the personal copies, when each of the personal copies was made, and when each of the personal copies was last modified.

Figure 8:
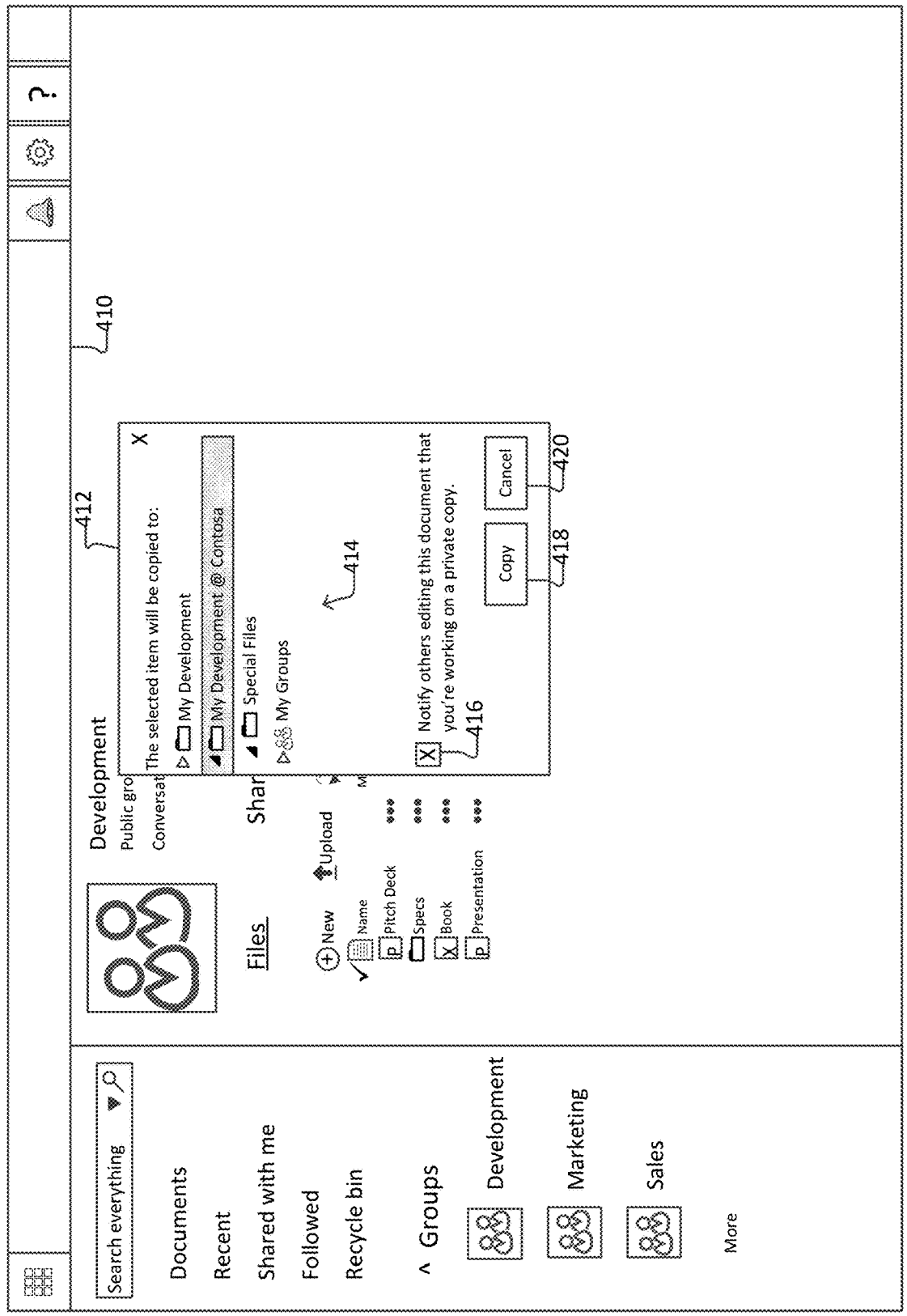
FIG. 8 shows an example user interface screen for identifying a personal storage location for a personal copy of a shared file generated by embodiments of the system of FIG. 1.

FIG. 8 shows an example user interface screen 410 for identifying a personal storage location for a personal copy of a shared file. In some embodiments, the user interface screen 410 is displayed by the user computing device 102. In some embodiments, the user interface screen 410 is generated by the user agent 108 based at least in part on information transmitted by the collaboration server 104.

In the example shown, the user interface screen 410 includes a prompt window 412. The prompt window 412 operates to prompt the user to select a location for storing the personal copy of the shared file. In some embodiments, the prompt window 412 is displayed as a pop-up window that overlays a listing of items. In the example shown, the prompt window 412 includes a location selector 414, a notification behavior selector 416, a copy control 418, and a cancel control 420.

The location selector 414 operates to receive a user selection of a location to store a personal copy of the shared file. In some embodiments, the location selector 414 includes a list of locations associated with the user. Additionally, in some embodiments, the location selector 414 will upon actuation of a listed location show additional sub-locations (e.g., sub directories) associated with the actuated location. Further, the location selector 414 may recursively present sub locations such that a user can drill down repeatedly to identify the correct location for the personal copy. The locations initially presented in the location selector 414 may be determined at least in part based on data stored in the user metadata 166.

The notification behavior selector 416 is used to specify the notification behavior relating to the personal copy. In some embodiments, the notification behavior selector 416 is a Boolean selector such as a checkbox. In these embodiments, the notification behavior may be toggled between two values such as notify and do not notify. In other embodiments, the notification behavior selector 416 includes additional options and may include a drop down list or another type of user interface element. Additional options may include various options relating to how and when others are notified of the personal copy. For example, one option may be to notify at least some others at the time the copy is made. Another option is to notify another user when the other user tries to access or modify the shared file associated with the personal copy. Some embodiments, include an option to keep the existence of the personal copy private and not notify other users of its existence in any circumstances.

Upon actuation, the copy control 418 causes a copy of the shared file to be made in the location identified by the location selector 414 with the notification behavior specified by the notification behavior selector 416. Upon actuation, the cancel control 420 cancels the pending copy operation and causes the prompt window 412 to be hidden.

Figure 9:
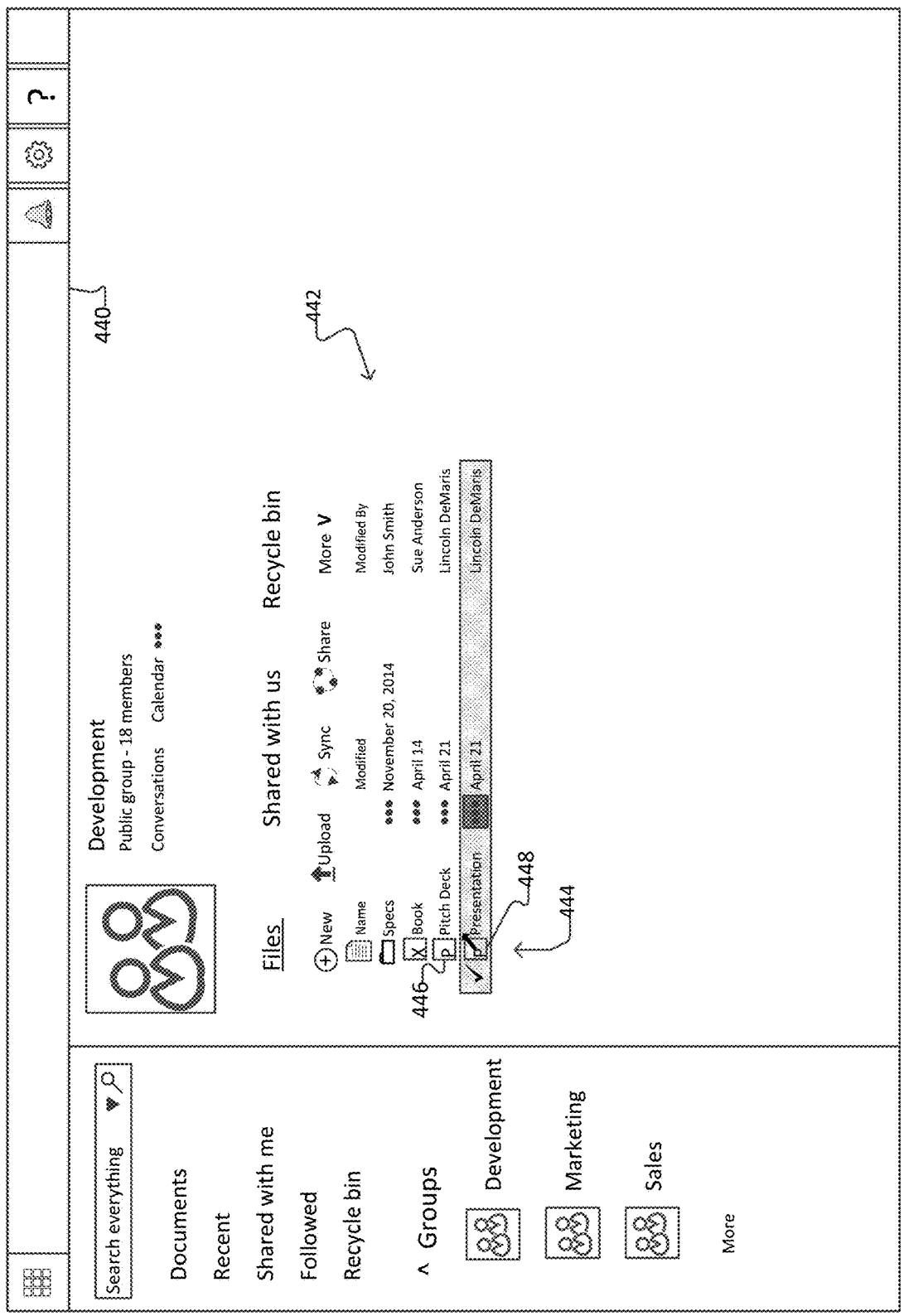
FIG. 9 shows an example user interface screen for viewing a listing of shared files after a personal copy of a shared file has been made generated by embodiments of the system of FIG. 1.

FIG. 9 shows an example user interface screen 440 for viewing a listing of shared files after a personal copy of a shared file has been made. In some embodiments, the user interface screen 440 is displayed by the user computing device 102. In some embodiments, the user interface screen 440 is generated by the user agent 108 based at least in part on information transmitted by the collaboration server 104.

In this example, the user interface screen 440 includes a listing 442. The listing 442 includes a list of items such as files and directories, and may be similar to the listing 372, which has been described previously. The listing 442 includes an icon column 444. The icon column 444 comprises a region to display an icon for each of the items listed in the listing 442. In some embodiments, the icon is a graphical representation of information. The icon column 444 may display an icon that indicates one or more of a type and a status of the corresponding item.

In the example user interface screen 440, multiple icons are shown, including the icon 446 and the icon 448. The icon 446 indicates a file type of the corresponding item. In this case, the icon 446 indicates that the corresponding item is a PowerPoint file. The icon 448 also indicates a file type of the corresponding item. In this case, the icon 448 indicates that the corresponding item is also a PowerPoint file. Additionally, the icon 448 indicates a status of the corresponding item. In this case, the icon 448 includes a green arrow indicating that a personal copy of the corresponding shared file exists. Of course, the green arrow is just an example, and other embodiments may indicate the existence of a personal copy differently.

Figure 10:
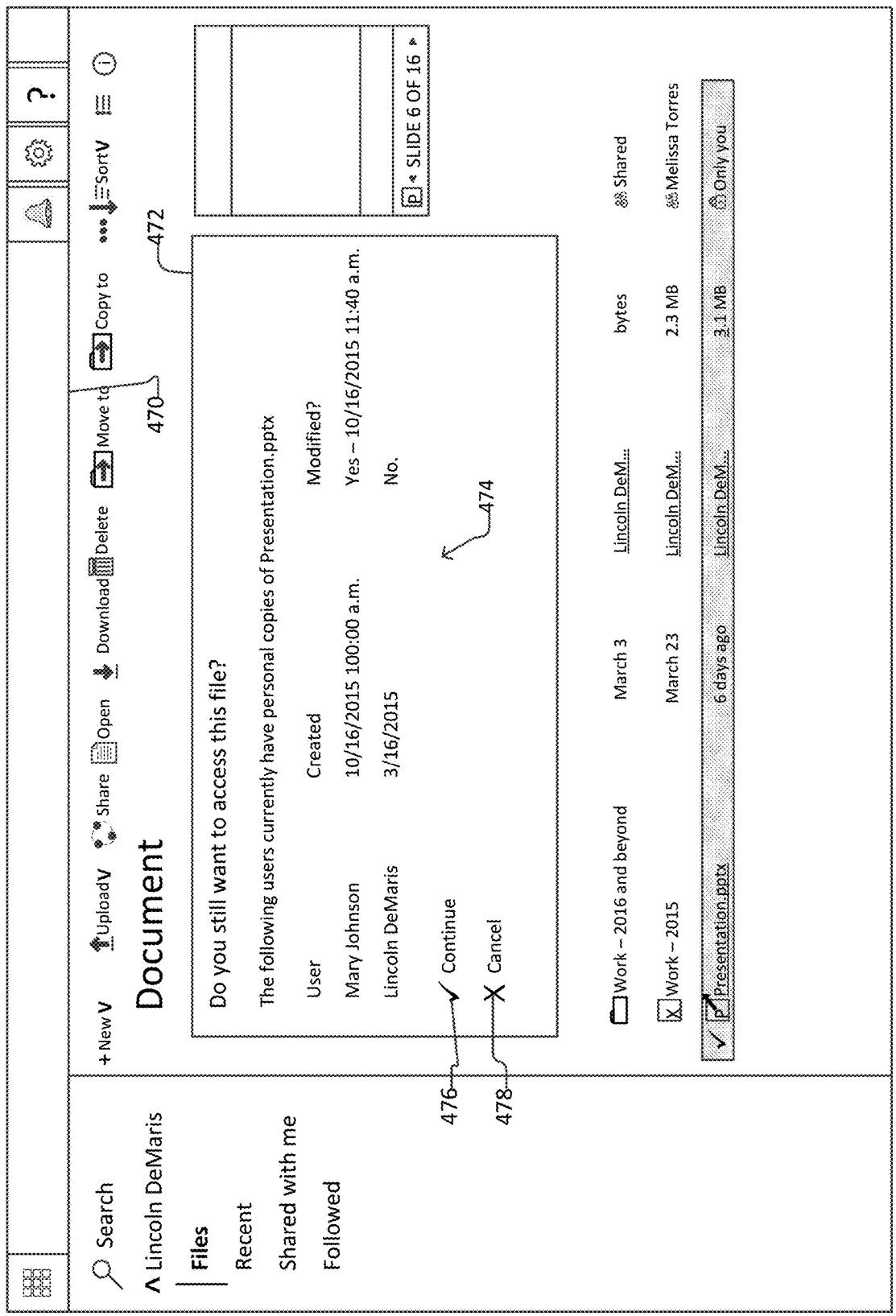
FIG. 10 shows an example user interface screen for communicating information to a user about existing personal copies of a shared file when a user attempts to access the shared file generated by embodiments of the system of FIG. 1.

FIG. 10 shows an example user interface screen 470 for communicating information to a user about existing personal copies of a shared file when a user attempts to access the shared file. In some embodiments, the user interface screen 470 is displayed by the user computing device 102. In some embodiments, the user interface screen 470 is generated by the user agent 108 based at least in part on information transmitted by the collaboration server 104.

In the example shown, the user interface screen 470 includes a prompt window 472 that is display when a user attempts to access a particular shared file for which personal copies exist. The prompt window 472 communicates to the user that personal copies of the corresponding shared file have been made and prompts the user to confirm whether to continue accessing the file. In some embodiments, the prompt window 472 is displayed as a pop-up window that overlays a listing of items. In the example shown, the prompt window 472 includes a listing 474 of personal copies, a continue control 476, and a cancel control 478.

The listing 474 includes a list of personal copies that have been made of the items. The listing 474 displays various information about the items such as the user who made the personal copy, when the personal copy was created, whether the personal copy has been modified, and when the personal copy was last modified. In other embodiments, the listing 474 may include additional or different information as well.

Figure 11:
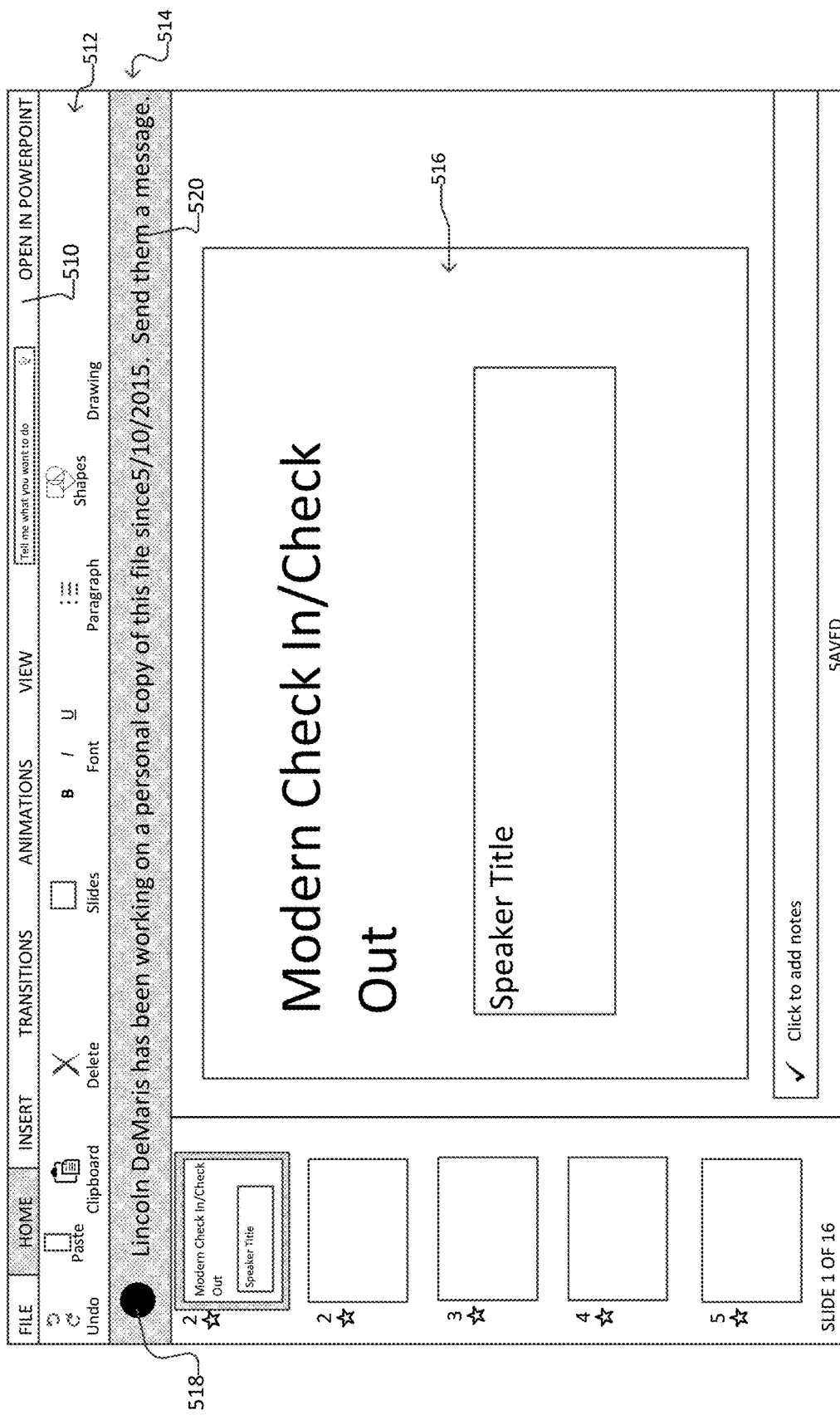
FIG. 11 shows an example user interface screen for accessing a shared file that is being privately edited generated by embodiments of the system of FIG. 1.

FIG. 11 shows an example user interface screen 510 for accessing a shared file that is being privately edited. In some embodiments, the user interface screen 510 is displayed by the user computing device 102. In some embodiments, the user interface screen 510 is generated by the user agent 108 based at least in part on information transmitted by the collaboration server 104. For example, the user interface screen 510 may be displayed in a web-based application for accessing the shared file. Alternatively, the user interface screen 510 may be displayed in a stand-alone application for accessing the shared file.

The example user interface screen 510 includes a command ribbon 512, a status message 514, and a file content panel 516. The command ribbon 512 includes various user interface elements related to the type of file being accessed and the tool being used to access the file. In the example shown, the file is being accessed using PowerPoint Online and various tools for editing the content of a PowerPoint file are included in the command ribbon 512.

The status message 514 communicates information to the user. In the example shown, the status message 514 communicates that a personal copy of the file exists and the date the personal copy was made. Some embodiments include different or additional information in the status message 514 as well. Additionally, in some embodiments, the status message 514 includes a user status indicator 518 and a message control 520. The user status indicator 518 operates to indicate a status of the other user who has made the personal copy of the file. For example, the status may relate to whether the other user is currently logged into a communication program, whether the other user is currently on a phone call, whether the other user is busy or free according to a calendar management program, or any other type of status relating to the other user.

Upon actuation, the message control 520 operates to start a process for sending a message to the other user who is identified as having made a personal copy of the shared file. In various embodiments, the message may be sent using various messaging technologies. Example messaging technologies include instant messaging, text messaging, and e-mail. Beneficially, the user can use the message control 520 to contact the other user with questions to determine the status of the shared file (e.g., whether the shared file is being actively worked on, etc.).

Figure 12:
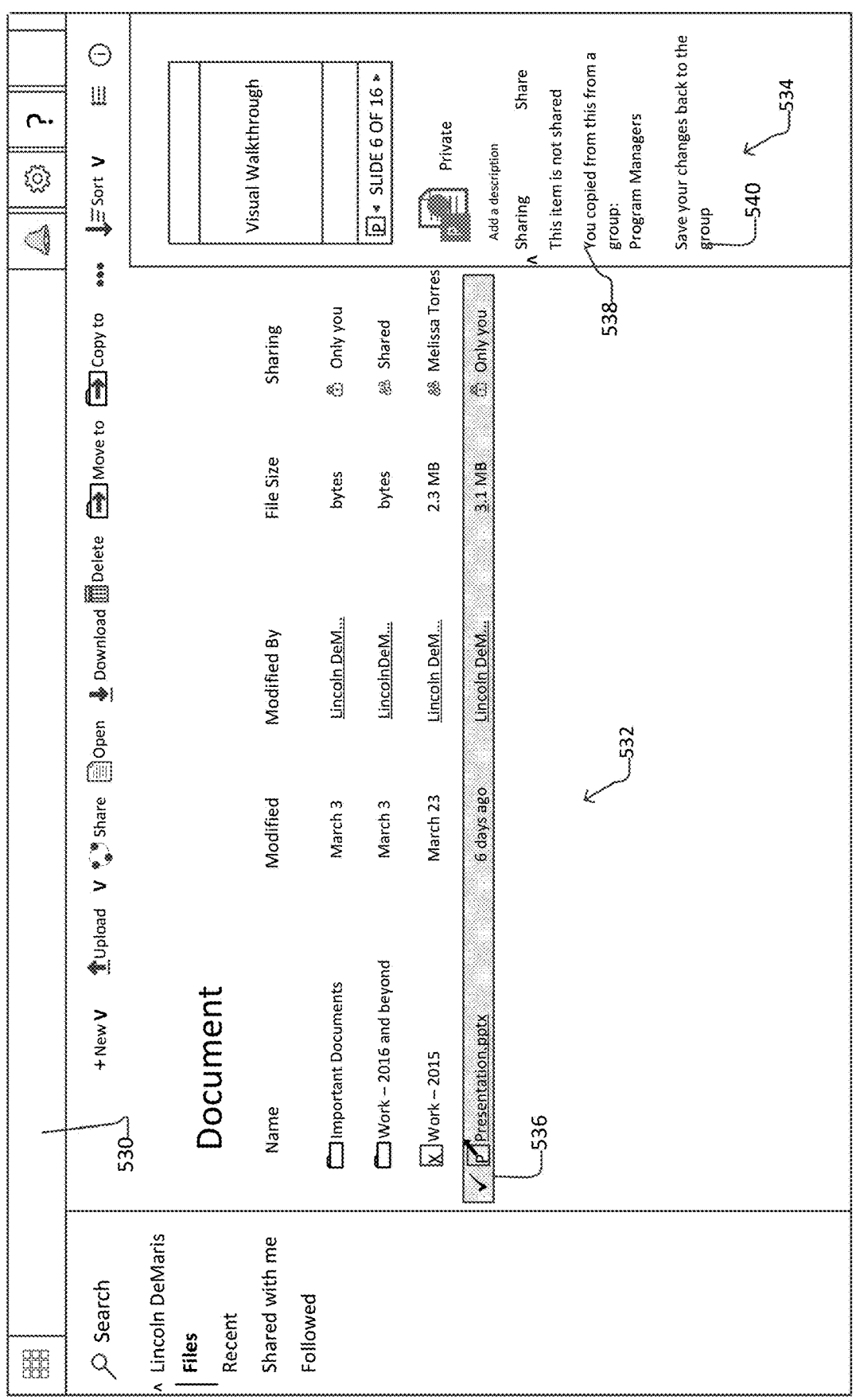
FIG. 12 shows an example user interface screen for a user to view files in a personal storage location and to publish a personal copy of a shared file generated by embodiments of the system of FIG. 1.

FIG. 12 shows an example user interface screen 530 for a user to view files in a personal storage location and to publish a personal copy of a shared file. In some embodiments, the user interface screen 530 is displayed by the user computing device 102. In some embodiments, the user interface screen 530 is generated by the user agent 108 based at least in part on information transmitted by the collaboration server 104.

In this example, the user interface screen 530 includes a listing 532 and a personal copy status panel 534. The listing 532 includes a list of items such as files and directories in the personal storage space, and may be similar to the listing 372, which has been described previously. In this example, the listing 532 includes a plurality of files and folders, including a selected file 536.

The personal copy status panel 534 operates to indicate whether the selected file is a personal copy of a shared file. In some embodiments, if the selected file is a personal copy of a shared file, the personal copy status panel 534 includes other information and elements as well. For example, the personal copy status panel 534 may include a shared file information message 538 and a publish control 540.

The shared file information message 538 may indicate that the selected file is a personal copy of a shared file and may identify the location from which the selected file was copied. In some embodiments, information about whether a file is a personal copy of a shared file is presented in other manners. For example, an icon or other indicator may be displayed in the listing 532 to indicate which, if any, of the listed items are personal copies of shared files.

The publish control 540 operates to start the process of publishing the selected personal copy back to the shared file. As is described elsewhere herein, the shared file may be saved over the existing shared file or merged with the existing shared file. In some embodiments, publishing the selected personal copy back to the shared file creates a new version of the shared file on the collaboration server 104. In some embodiments, the publish control 540 is omitted when the personal copy has not been modified. In some of these embodiments, a clear control is included instead. The clear control may clear metadata from the file metadata 162 related to the shared copy and, in some embodiments, delete the personal copy from the user computing device 102.

Figure 13:
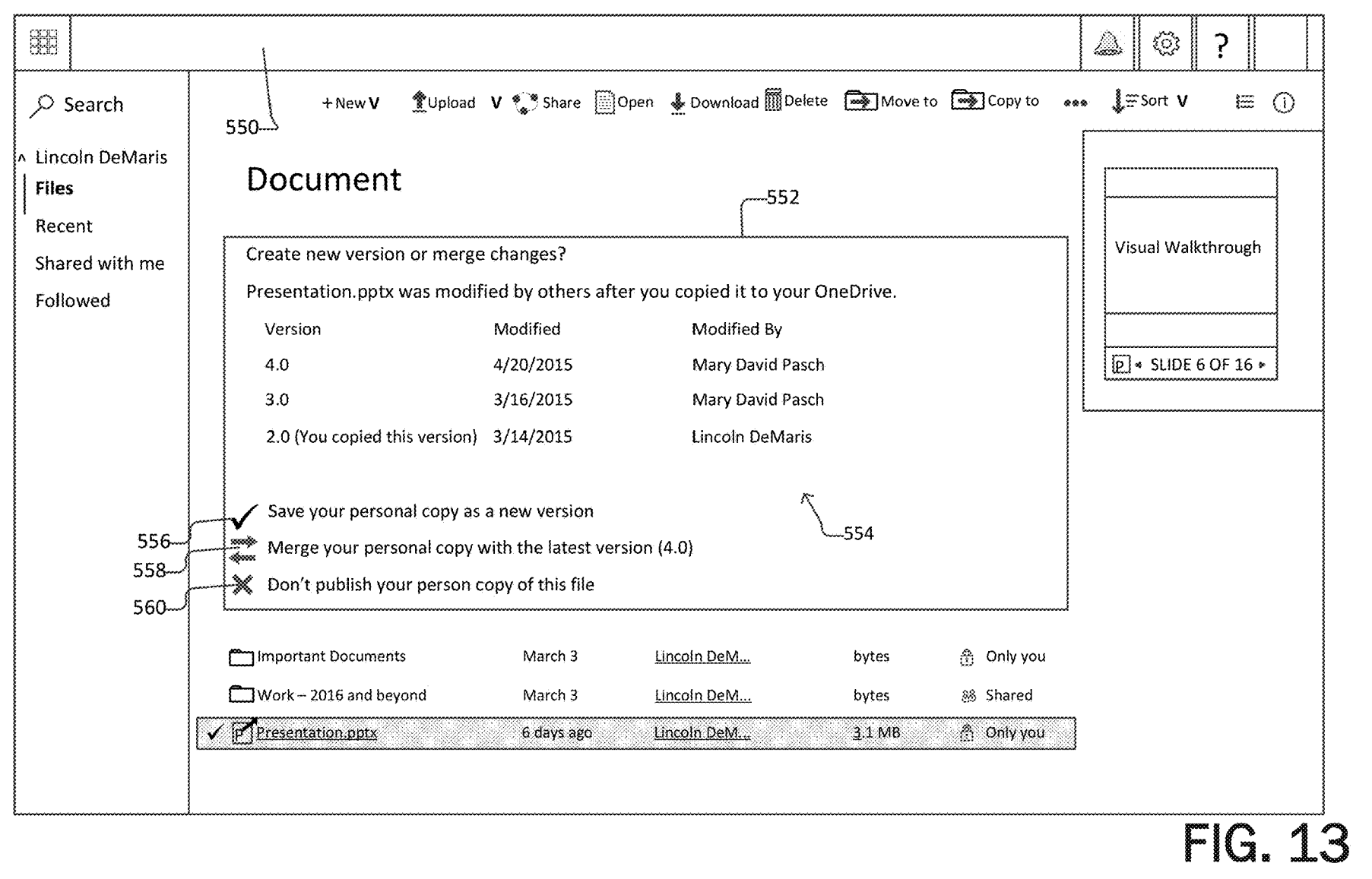

FIG. 13 shows an example user interface screen 550 for communicating to a user that the shared file was modified after the personal copy was made and prompting the user about how to publish the personal copy. In some embodiments, the user interface screen 550 is displayed by the user computing device 102. In some embodiments, the user interface screen 550 is generated by the user agent 108 based at least in part on information transmitted by the collaboration server 104.

In the example shown, the user interface screen 550 includes a prompt window 552. The prompt window 552 operates to communicate information about changes to the shared file and to prompt the user to select a publish behavior for the shared file. In some embodiments, the prompt window 552 is displayed as a pop-up window that overlays a listing of items. In the example shown, the prompt window 552 includes a listing 554 of changes, an overwrite control 556, a merge control 558, and a cancel control 560.

The listing 554 includes information about changes that were made to the shared file after the personal copy was made. In some embodiments, the listing 554 includes a version number, a modification date, and a name of the user who modified the file. Additionally, in some embodiments, the rows in the listing 554 may be user-actuatable controls that upon actuation show the identified version of the file. Some embodiments include additional or different information as well.

Upon actuation, the overwrite control 556 causes the personal copy to be stored as the shared file, potentially overwriting any changes made by other users after the personal copy was made. In some embodiments, the personal copy is stored as a new version on the collaboration server 104.

Upon actuation, the merge control 558 causes the personal copy to be merged and the merged file to be stored as the shared file. In some embodiments, the merged file is stored as a new version on the collaboration server. In some embodiments, if multiple changes have been made to the shared file since the personal copy was created, the user may be prompted to select which version of the shared file to use in the merge. In other embodiments, the personal copy is merged with the most recent version of the shared file without prompting the user.

Upon actuation, the cancel control 560 cancels the pending publish operation and causes the prompt window 552 to be hidden. Generally, the personal copy of the shared file is retained so that the user can later choose to publish it.

Figure 14:
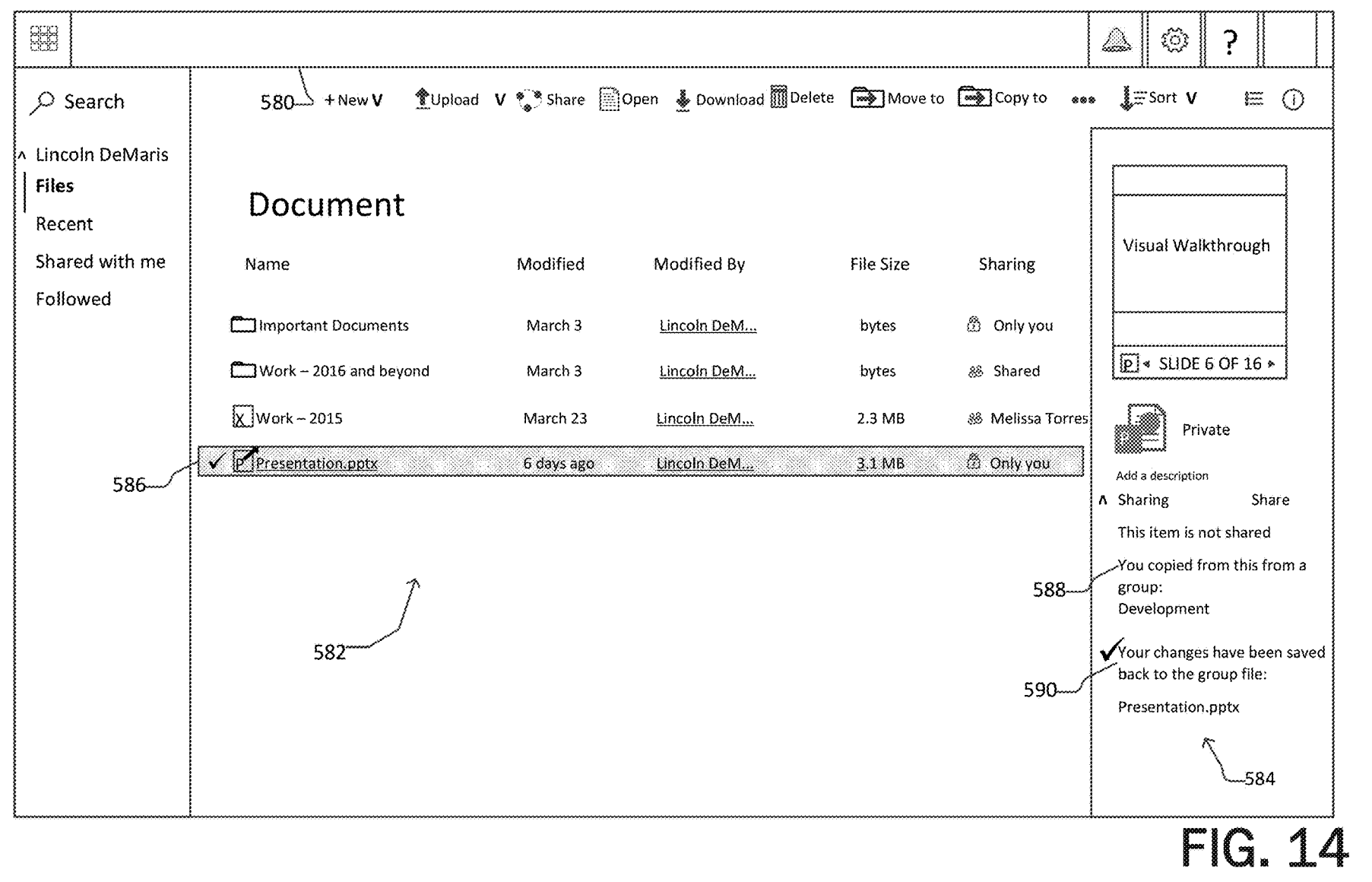

FIG. 14 shows an example user interface screen 580 for a user to view files stored in a personal storage location and to confirm publication of a personal copy of a shared file stored therein. In some embodiments, the user interface screen 580 is displayed by the user computing device 102. In some embodiments, the user interface screen 580 is generated by the user agent 108 based at least in part on information transmitted by the collaboration server 104.

In this example, the user interface screen 580 includes a listing 582 and a personal copy status panel 584. The listing 582 includes a list of items such as files and directories in the personal storage space, and may be similar to the listing 532, which has been described previously. In this example, the listing 582 includes a plurality of files and folders, including a selected file 586.

The personal copy status panel 584 operates to indicate whether the selected file is a personal copy of a shared file and may be similar to the personal copy status panel 534, which has been described previously. In some embodiments, if the selected file is a personal copy of a shared file that has been recently published, the personal copy status panel 584 includes other information and elements as well. For example, the personal copy status panel 584 may include a shared file information message 588 and a publish status message 590. The shared file information message 588 may be similar to the previously described shared file information message 538.

The publish status message 590 operates to indicate that the personal copy has been published back to the shared file. In some embodiments, the publish status message 590 also includes additional information such as the version number assigned to the published file and when the changes were published. In some embodiments, the publish status message 590 is displayed for a predetermined duration of time after the personal copy is published. Alternatively, the publish status message 590 may be displayed until a different file is selected in the listing 582.

Figure 15:
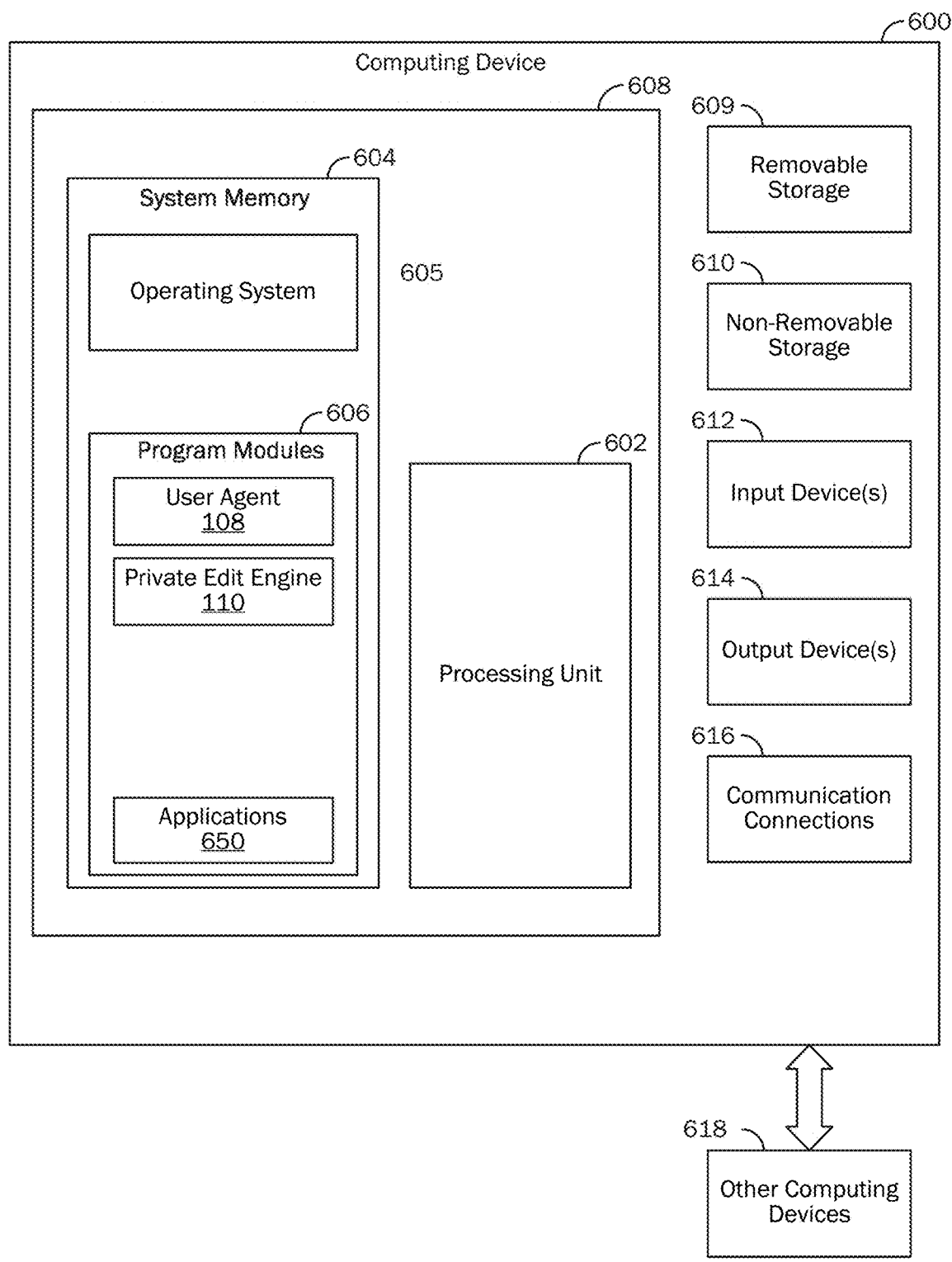
FIG. 15 is a block diagram illustrating example physical components of a computing device.

FIG. 15 is a block diagram illustrating physical components (i.e., hardware) of a computing device 600 with which examples of the present disclosure are practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the system memory 604 includes the private edit engine 110. The operating system 605, for example, is suitable for controlling the operation of the computing device 600. Furthermore, aspects are practiced in conjunction with a graphics library, other operating systems, or any other application program, and is not limited to any particular application or system. This basic configuration is illustrated in FIG. 15 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 15 by a removable storage device 609 and a non-removable storage device 610.

As stated above, according to an aspect, a number of program modules and data files are stored in the system memory 604. While executing on the at least one processing unit 602, the program modules 606 (e.g., private edit engine 110) perform processes including, but not limited to, one or more of the stages of the methods 210, 260, 290, 330 illustrated in FIGS. 3-6. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 15 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media as used herein includes computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

Figure 16:
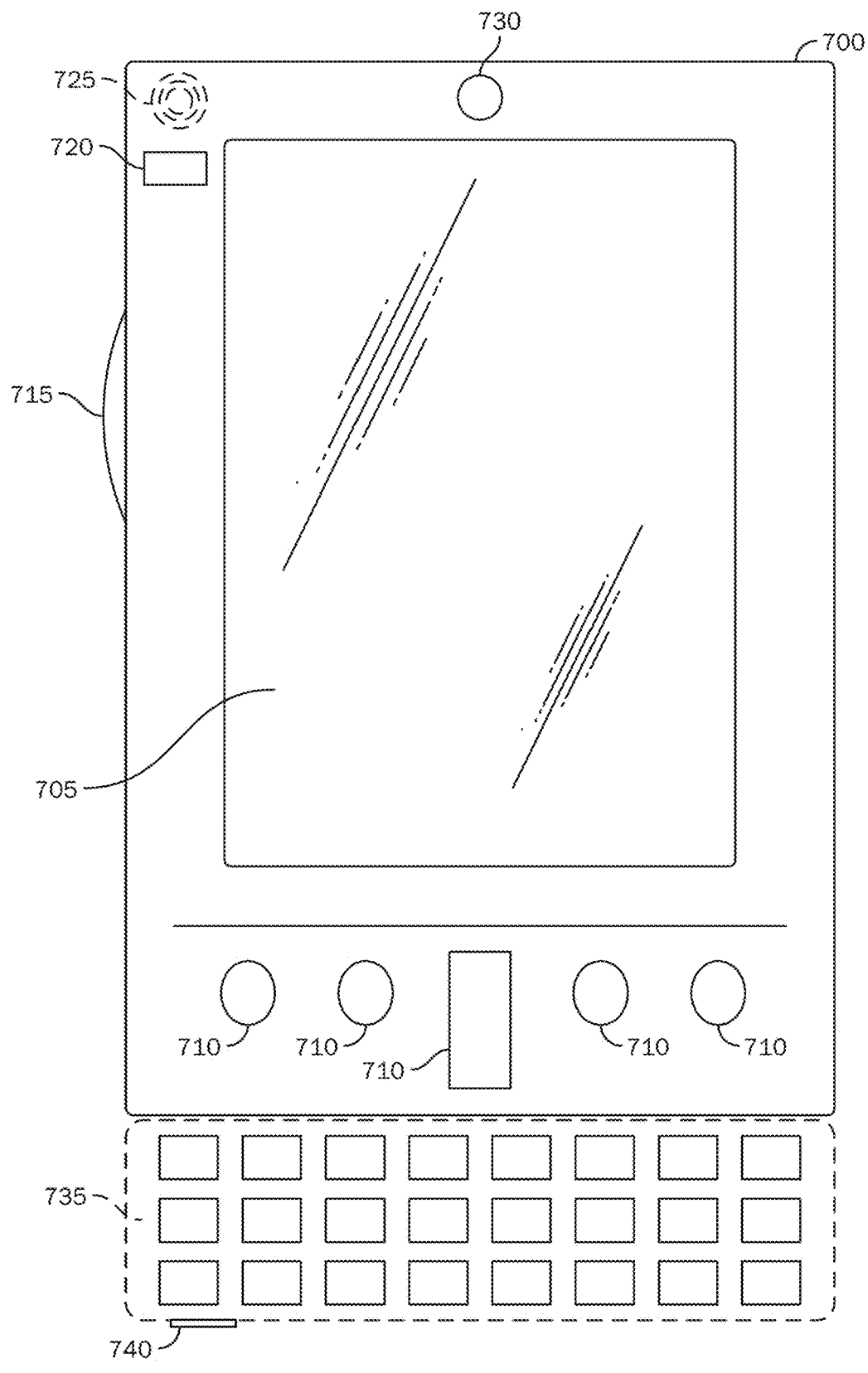
FIG. 16 is a simplified block diagram of a mobile computing device.
Figure 17:
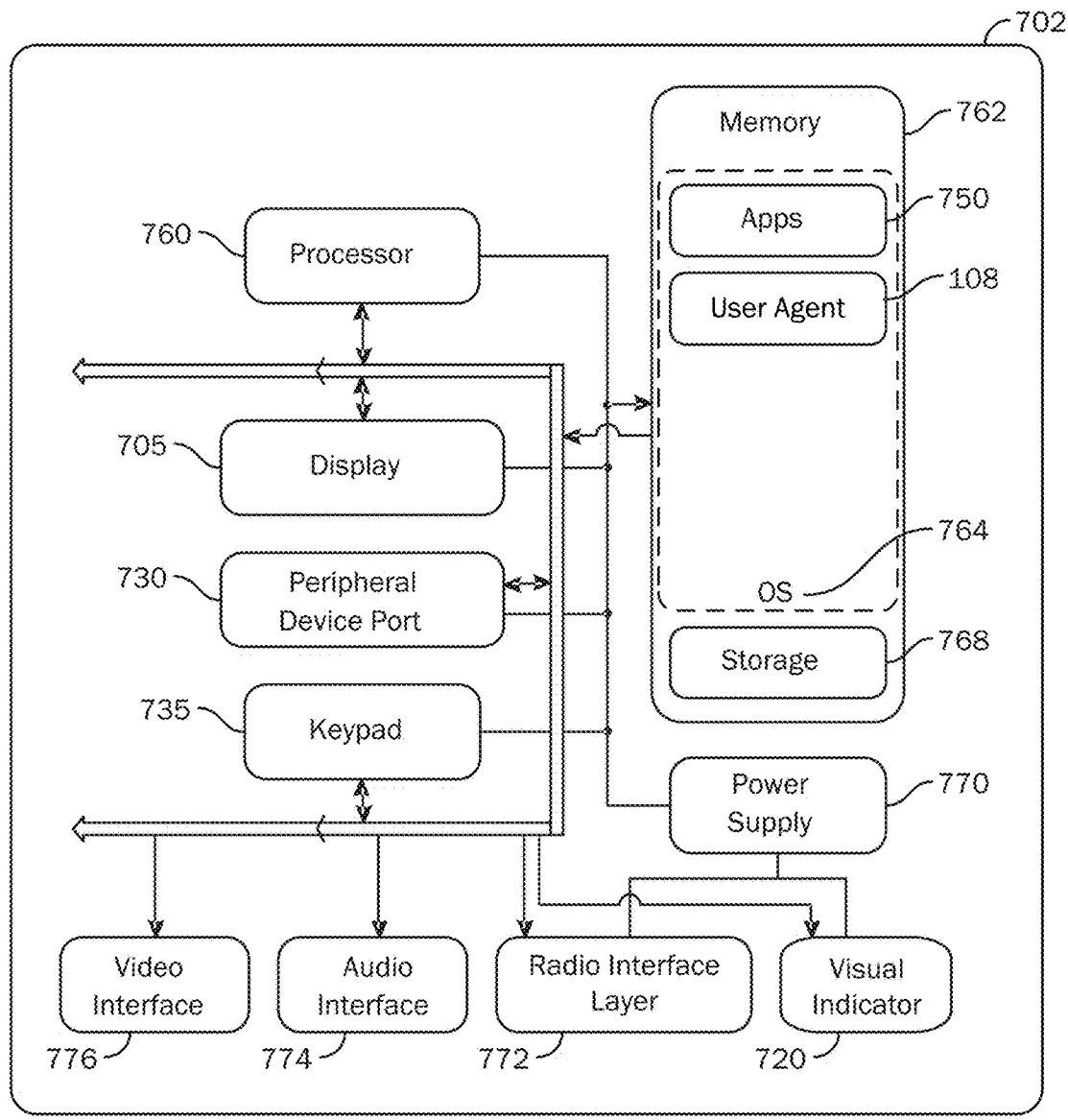
FIG. 17 is another simplified block diagram of a mobile computing device.

FIGS. 16 and 17 illustrate a mobile computing device 700, for example, a mobile telephone, a smart phone, a tablet personal computer, a laptop computer, and the like, with which aspects may be practiced. With reference to FIG. 16, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or fewer input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 17 is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, user agent 108 is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as files and other information used by the user agent 108, and the like. In some embodiments, a synchronization application (not shown) also resides on the system 702 and is programmed to interact with a corresponding synchronization application resident on a host computer (e.g., user storage server 106) to keep the information stored in the non-volatile storage area 768 synchronized with corresponding information stored at the host computer such as in one of the personal data stores 116. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 is stored locally on the mobile computing device 700, as described above. According to another aspect, the data is stored on any number of storage media that is accessible by the device via the radio 772 or via a wired connection between the mobile computing device 700 and a separate computing device associated with the mobile computing device 700, for example, a server computer in a distributed computing network, such as the Internet. As should be appreciated such data/information is accessible via the mobile computing device 700 via the radio 772 or via a distributed computing network. Similarly, according to an aspect, such data/information is readily transferred between computing devices for storage and use according to well-known data/information transfer and storage means, including electronic mail and collaborative data/information sharing systems.

Figure 18:
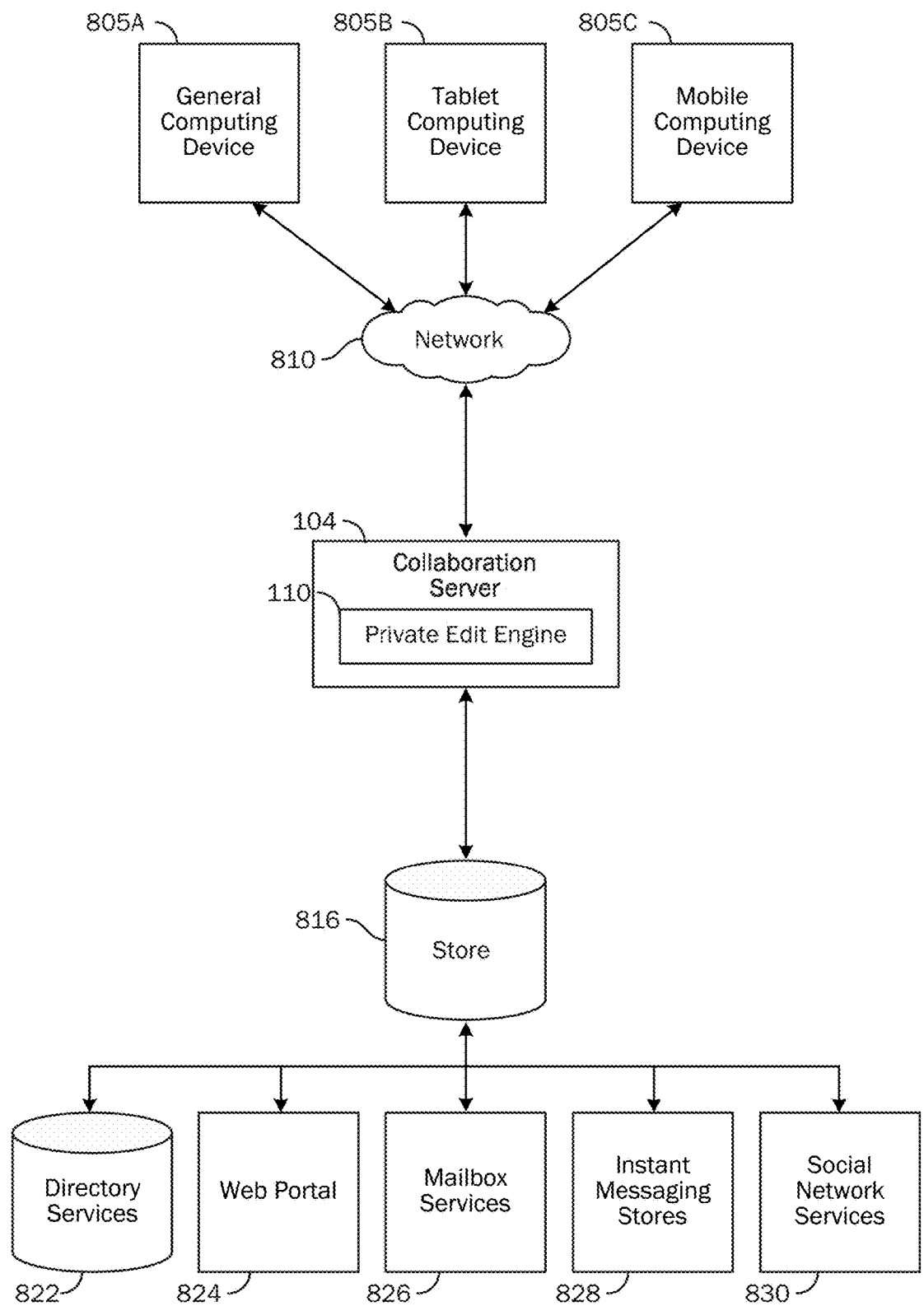
FIG. 18 illustrates one example of the architecture of a system for privately editing shared files.

FIG. 18 illustrates one example of the architecture of a system for privately editing shared files as described above. Files generated, accessed through, or edited in association with the private edit engine 110 may originate in or be stored in different communication channels or other storage types. For example, various documents may be stored using a directory service 822, a web portal 824, a mailbox service 826, an instant messaging store 828, or a social networking site 830. The private edit engine 110 is operable to use any of these types of systems or the like for facilitating private editing of shared file by one or more users in an organization, as described herein. According to an aspect, the collaboration server 104 provides the private edit engine 110 to clients 805A, 805B, 805C. As one example, the collaboration server 104 is a web server providing the private edit engine 110 over the web. The collaboration server 104 provides the private copy engine over the web to clients 805 through a network 810. By way of example, the client computing device is implemented and embodied in a personal computer 805A, a tablet computing device 805B or a mobile computing device 805C (e.g., a smart phone), or other computing device. Any of these examples of the client computing device are operable to privately edit shared files stored in the store 816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

What is claimed is:

1. A system, comprising:
   at least one processor; and
   a memory storing instructions that, when executed by the at least one processor, cause the system to:
   cause a client device to display a user interface that includes:
      a listing of a plurality of shared files that are stored in a collaborative space that is facilitated by a collaboration server, wherein the collaborative space facilitates network-based access to the plurality of shared files in association with a plurality of user identities, and
      an edit privately control that is displayed in association with an individual shared file of the plurality of shared files;
   receive, as a result of an actuation of the edit privately control and from the client device, a request to privately edit the individual shared file;
   determine a personal storage space that is facilitated by a user storage server and that uniquely corresponds to a user identity that is associated with the client device from which the request to privately edit the individual shared file is received;
   cause, in response to the indication to privately edit the individual shared file, a personal copy of the individual shared file to be generated in the personal storage space that is facilitated by the user storage server, wherein the personal storage space facilitates network-based access to the personal copy in association with the user identity;
   receive, from the client device, edits to the personal copy made by the user identity;
   update metadata associated with the individual shared file to indicate that the personal copy has been generated, that the edits to the personal copy have been made by the user identity, and that the edits have not been merged into the individual shared file via a publish instruction;
   receive another request from another client device to access the individual shared file; and
   cause, based on the metadata, the other client device to display a notification that the personal copy has been generated in association with the user identity, wherein the notification includes:
      a date and a time when the personal copy of the individual shared file is generated;
      an indication that the edits have been made to the personal copy by the user identity; and
      an indication that the edits have not been merged into the individual shared file via the publish instruction.

2. The system of claim 1, wherein the listing of the plurality of shared files comprises a plurality of file-identification controls operative to identify individual ones of the plurality of shared files.

3. The system of claim 2, wherein upon actuation of an individual one of the plurality of file-identification controls, the edit privately control is displayed in association with the individual shared file.

4. The system of claim 1, wherein the instructions further cause the system to:
   cause the user interface to further include a publish control in association with the personal copy of the individual shared file, wherein the publish control is selectable to publish the personal copy of the individual shared file to the collaborative space.

5. The system of claim 4, wherein the instructions further cause the system to:
   receive, via a selection of the publish control, the publish instruction that is generated in association with the personal copy of the individual shared file; and
   responsive to receiving the publish instruction, publishing the personal copy, that is stored in the personal storage space, into the shared individual file that is stored in the collaborative space that is facilitated by a collaboration server.

6. The system of claim 1, wherein updating the metadata includes generating a record associated with the individual shared file comprising the user identity and a timestamp comprising the date and the time when the personal copy of the individual shared file is generated.

7. The system of claim 1, wherein the instructions further cause the system to:
   transmit information related to the personal copy to a user agent associated with the user identity.

8. The system of claim 7, wherein the information comprises the user identity associated with the personal copy and a last modified date for the personal copy.

9. The system of claim 1, wherein the instructions further cause the system to:
   responsive to the request to privately edit the individual shared file, cause the client device to prompt a user to identify a location of the personal storage space that is facilitated by the user storage server.

10. A method of managing private editing of a shared file, the method comprising:
- generating a user interface comprising a listing of a plurality of shared files accessible in a collaborative space that facilitates network-based access to the plurality of shared files in association with a plurality of user identities;
- receiving an edit privately request in association with a user identity, of the plurality of user identities, and an individual shared file of the plurality of shared files;
- responsive to receiving the edit privately request, causing generation of a personal copy of the individual shared file in a personal storage space that is facilitated by a user storage server and that corresponds to the user identity that is associated with the edit privately request;
- determining that edits to the personal copy have been made by the user identity and that the edits have not been merged into the individual shared file via a publish instruction;
- updating metadata associated with the individual shared file to indicate that the personal copy has been generated in association with the user identity, that the edits to the personal copy have been made by the user identity, and that the edits have not been merged into the individual shared file via the publish instruction;
- receiving an access request, from a device associated with another user identity of the plurality of user identities, to access the individual shared file; and
- causing, based on the metadata, a notification to be displayed on the device associated with the other user identity, the notification including:
  - a date and a time when the personal copy of the individual shared file is generated;
  - an indication that the edits have been made to the personal copy by the user identity; and
  - an indication that the edits have not been merged into the individual shared file via the publish instruction.

11. The method of claim 10, further comprising transmitting user interface data to a user agent running on a user computing device to cause the user interface to be displayed on the user computing device.

12. The method of claim 11, wherein the user interface comprises a webpage that is configured to be displayed by a browser running on the user computing device.

13. The method of claim 11, wherein receiving the edit privately request comprises receiving the edit privately request over a network from the user agent.

14. The method of claim 13, wherein the user computing device is a smart phone.

15. The method of claim 10, the method further comprising:
- causing the user interface to include a publish control that is selectable to publish the personal copy of the individual shared file to the collaborative space from the personal storage space that is facilitated by the user storage server.

16. A collaboration server, comprising:
- at least one processor; and
- a memory storing instructions that, when executed by the at least one processor, cause the collaboration server to:
  - cause a client device to display a user interface comprising:
    - a listing of a plurality of shared files that are accessible in a collaborative space that is facilitated by the collaboration server, and
    - an edit privately control that is displayed in association with an individual shared file of the plurality of shared files;
  - receiving an edit privately request that is associated with a user identity, of the plurality of user identities, and that is generated based on an actuation of the edit privately control;
  - identifying a personal storage space that facilitates network-based data storage associated with the user identity;
  - responsive to the edit privately request, generating a personal copy of the individual shared file in the personal storage space that facilitates network-based data storage associated with the user identity;
  - determining that edits to the personal copy have been made by the user identity and that the edits have not been merged into the individual shared file via a publish instruction;
  - updating metadata associated with the individual shared file to indicate that the personal copy was generated in association with the user identity, that the edits to the personal copy have been made by the user identity, and that the edits have not been merged into the individual shared file via the publish instruction;
  - receiving an access request, from a device associated with another user identity of the plurality of user identities, to access the individual shared file; and
  - causing, based on the metadata, a notification to be displayed on the device associated with the other user identity, the notification including:
    - a date and a time when the personal copy of the individual shared file is generated;
    - an indication that the edits have been made to the personal copy by the user identity; and
    - an indication that the edits have not been merged into the individual shared file via the publish instruction.

17. The collaboration server of claim 16, the user interface further comprising a publish control to publish, upon selection, the personal copy of the individual shared file to the collaborative space from the personal storage space that facilitates network-based data storage associated with the user identity.

* * * * *